US012692078B2

(12) United States Patent
Lindbo

(10) Patent No.: US 12,692,078 B2
(45) Date of Patent: Jul. 28, 2026

(54) AUTOMATED STORAGE SYSTEMS AND DEVICES

(71) Applicant: Ocado Innovation Limited, Hatfield (GB)

(72) Inventor: Lars Sverker Ture Lindbo, Hatfield (GB)

(73) Assignee: Ocado Innovation Limited, Hatfield (GB)

( * ) Notice: Subject to any disclaimer, the term of this patent is extended or adjusted under 35 U.S.C. 154(b) by 765 days.

(21) Appl. No.: 17/908,706

(22) PCT Filed: Mar. 3, 2021

(86) PCT No.: PCT/EP2021/055385
§ 371 (c)(1),
(2) Date: Sep. 1, 2022

(87) PCT Pub. No.: WO2021/175949
PCT Pub. Date: Sep. 10, 2021

(65) Prior Publication Data
US 2023/0126335 A1     Apr. 27, 2023

(30) Foreign Application Priority Data

Mar. 4, 2020    (GB) ..................................... 2003090

(51) Int. Cl.
*B65G 1/137*        (2006.01)
*B65G 1/04*         (2006.01)

(52) U.S. Cl.
CPC ......... *B65G 1/1375* (2013.01); *B65G 1/0464* (2013.01)

(58) Field of Classification Search
CPC .. B65G 1/0464; B65G 1/0478; B65G 1/0492; B65G 1/065; B60L 15/007;
(Continued)

(56) References Cited

U.S. PATENT DOCUMENTS

| | | | |
|---|---|---|---|
| 2,524,383 A | 10/1950 | Hearne et al. | |
| 2,701,065 A | 2/1955 | Bertel | |

(Continued)

FOREIGN PATENT DOCUMENTS

| | | | |
|---|---|---|---|
| CN | 110239871 A | 9/2019 | |
| EP | 0767113 B1 | 7/2002 | |

(Continued)

OTHER PUBLICATIONS

Office Action issued on Sep. 26, 2024, by the U.S. Patent and Trademark Office in co-pending U.S. Appl. No. 17/908,774. (20 pages).

(Continued)

*Primary Examiner* — Timothy R Waggoner
(74) *Attorney, Agent, or Firm* — Gregory Matt McCloskey

(57)        ABSTRACT

A grid framework structure is disclosed having first set of parallel rails or tracks and a second set of parallel rails or tracks forming a grid pattern with grid spaces. The grid is supported by a set of uprights to form a plurality of vertical storage locations beneath the grid for containers to be stacked between and be guided by the uprights in a vertical direction through the plurality of grid spaces. A load handling device includes: a drive assembly having at least two motors for driving a first set of wheels; at least two motors for driving a second set of wheels, wherein each motor is positioned such that its drive shaft is parallel and non-coaxially arranged with respect to the axis of rotation of its respective wheel; and, a number of gear arrangements corresponding to the number of motors for transferring drive from the motors to the wheels.

23 Claims, 17 Drawing Sheets

(58) Field of Classification Search

CPC .............. B60L 2220/46; B60K 7/0007; B60K 2007/0061; B60K 1/02

See application file for complete search history.

(56) References Cited

U.S. PATENT DOCUMENTS

| | | | |
|---|---|---|---|
| 4,088,232 | A | 5/1978 | Lilly et al. |
| 10,294,025 | B2 | 5/2019 | Hognaland et al. |
| 10,336,540 | B2 | 7/2019 | Gravelle et al. |
| 10,703,564 | B2 | 7/2020 | Hognaland et al. |
| 10,882,540 | B2 | 1/2021 | Stadie et al. |
| 2005/0118003 | A1 | 6/2005 | Mitchell et al. |
| 2009/0071732 | A1* | 3/2009 | Kim ...................... B60G 3/145 |
| | | | 180/24.07 |
| 2016/0194151 | A1* | 7/2016 | Lindbo ................ B65G 1/0464 |
| 2018/0050589 | A1* | 2/2018 | Yu ............................ F16H 7/023 |
| 2018/0148259 | A1* | 5/2018 | Gravelle .................. B65G 1/04 |
| 2019/0019707 | A1* | 1/2019 | Suzuki ..................... B25J 9/104 |
| 2023/0125328 | A1 | 4/2023 | Lindbo |

FOREIGN PATENT DOCUMENTS

| | | | |
|---|---|---|---|
| EP | 1037828 | B1 | 9/2003 |
| GB | 2517264 | A | 2/2015 |
| GB | 2520104 | A | 5/2015 |
| GB | 2524383 | B | 1/2017 |
| WO | 2015019055 | A1 | 2/2015 |
| WO | 2015127828 | A1 | 9/2015 |
| WO | 2015193278 | A1 | 12/2015 |
| WO | 2019170805 | A1 | 9/2019 |
| WO | 2019206437 | A1 | 10/2019 |
| WO | 2019206482 | A1 | 10/2019 |
| WO | 2019238703 | A1 | 12/2019 |

OTHER PUBLICATIONS

Office Action issued Nov. 24, 2023, by the Canadian Intellectual Property Office in corresponding Canadian Patent Application No. 3,174,051. (4 pages).

International Search Report (PCT/ISA/210) and Written Opinion (PCT/ISA/237) mailed on Jun. 9, 2021, by the European Patent Office as the International Searching Authority for International Application No. PCT/EP2021/055392. (12 pages).

International Search Report (PCT/ISA/210) and Written Opinion (PCT/ISA/237) mailed on May 31, 2021, by the European Patent Office as the International Searching Authority for International Application No. PCT/EP2021/055385. (14 pages).

Search and Examination Report dated Aug. 11, 2021 by the British Patent Office for Application No. 2103004.4. (8 pages).

Search and Examination Report dated Aug. 9, 2021 by the British Patent Office for Application No. 2102988.9. (6 pages).

Search Report dated Nov. 25, 2020 by the British Patent Office for Application No. 2003092.0. (1 page).

Office Action (Examination Report No. 1) issued on Aug. 29, 2023, by the Australian Patent Office in corresponding Australian Patent Application No. 2021231547. (5 pages).

* cited by examiner

(a)

(a)

(b)

(a)

(b)

274

273        272

273        272

272

274        273

272        274

274        272

272        274

274        272

AUTOMATED STORAGE SYSTEMS AND DEVICES

FIELD OF THE INVENTION

The present invention relates to automated storage systems devices. More specifically but not exclusively, it relates to load handling devices operating on a storage system, the storage systems having storage bins in stacks, the stacks being located within a grid structure.

This application claims priority from UK Patent Application No. GB2003090.4 filed 4 Mar. 2020, the content of which is incorporated herein by reference.

BACKGROUND

Methods of handling containers stacked in rows have been well known for decades. Some such systems, for example as described in U.S. Pat. No. 2,701,065, to Bertel, comprise free-standing stacks of containers arranged in rows in order to reduce the storage volume associated with storing such containers but yet still provide access to a specific container if required. Access to a given container is made possible by providing relatively complicated hoisting mechanisms which can be used to stack and remove given containers from stacks. The costs of such systems are, however, impractical in many situations and they have mainly been commercialised for the storage and handling of large shipping containers.

The concept of using free-standing stacks of containers and providing a mechanism to retrieve and store specific containers has been developed further, for example as described in EP 0767113 B to Cimcorp. EP'113 discloses a mechanism for removing a plurality of stacked containers, using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack).

In the system described in EP'113, the height of the tube has to be at least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler.

EP 1037828 B1 (Autostore) describes a system in which stacks of containers are arranged within a frame structure. A system of this type is illustrated schematically in FIGS. 1 to 4 of the accompanying drawings. Robotic load handling devices can be controllably moved around the stack on a system of tracks on the uppermost surface of the stack.

A load handling device is described in UK Patent Application No. GB2520104A—Ocado Innovation Limited— where each robotic load handler only covers one grid space, thus allowing high density of load handlers and thus high throughput of a given size system.

In the known robotic picking systems described above, robotic load handling devices are controllably moved around the top of the stacks on a track system forming a grid. A given load handling device lifts a bin from the stack, the container being lifted containing inventory items needed to fulfil a customer order. The container is carried to a pick station where the required inventory item may be manually removed from the bin and placed in a delivery container, the delivery container forming part of the customer order, and being manually filled for dispatch at the appropriate time. At the pick station, the items may also be picked by industrial robots, suitable for such work, for example as described in UK Patent Application No GB2524383B—Ocado Innovation Limited.

As shown in FIGS. 1 and 2, stackable storage containers, known as bins 10, are stacked on top of one another to form stacks 12. The stacks 12 are arranged in a framework 14 in a warehousing or manufacturing environment. FIG. 1 is a schematic perspective view of the framework 14, and FIG. 2 is a top-down view showing a single stack 12 of bins 10 arranged within the framework 14. Each bin 10 typically holds a plurality of product or inventory items, and the inventory items within a bin 10 may be identical, or may be of different product types depending on the application. Furthermore, the bins 10 may be physically subdivided to accommodate a plurality of different inventory items.

The framework 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the framework 14, so that the framework 14 guards against horizontal movement of the stacks 12 of bins 10, and guides vertical movement of the bins 10.

The top level of the framework 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the framework 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

Each load handling device 30 comprises a vehicle 32 which is arranged to travel in the X and Y directions on the rails 22 of the framework 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, are arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set 22a of rails 22 and the second set of wheels 36 are lifted clear from the second set 22b of rails 22, the first set of wheels 34 can be driven, by way of a drive mechanism (not shown) housed in the vehicle 32, to move the load handling device 30 in the X direction. To move the load handling device 30 in the Y direction, the first set of wheels 34 are lifted clear of the first set 22a of rails 22, and the second set of wheels 36 are lowered into engagement with the second set 22b of rails 22. The drive mechanism can then be used to drive the second set of wheels 36 to achieve movement in the Y direction.

In this way, one or more robotic load handling devices 30 can move around the top surface of the stacks 12 on the framework 14, as shown in FIG. 4 under the control of a centralised control utility (not shown). Each robotic load handling device 30 is provided with lifting means 38 for lifting one or more bins 10 from the stack 12 to access the required products.

The body of the vehicle 32 comprises a cavity 40, the cavity 40 being of a size capable of holding a bin 10. The lifting means 38 comprises winch means and a bin gripper assembly 39. The lifting means lifts a bin 10 from the stack 12 to within the cavity 40 within the body of the vehicle 32. When in the cavity 40, the bin 10 is lifted clear of the rails beneath, so that the load handling device can move laterally to a different location on the grid. On reaching the target location, for example another stack, an access point in the storage system or a conveyor belt, the bin 10 can be lowered from the cavity and released from the gripper assembly 39.

In this way, multiple products can be accessed from multiple locations in the grid and stacks at any one time.

The above description describes a storage system in connection with, for example, groceries. FIG. 4 shows a typical such storage system, the system having a plurality of load handling devices 30 active on the grid above the stacks 12.

FIGS. 1 and 4 show the bins 10 in stacks 12 within the storage system. It will be appreciated that there may be a large number of bins 10 in any given storage system and that many different items may be stored in the bins 10 in the stacks 12. Each bin 10 may contain different categories of inventory items within a single stack 12.

In one system described above and further in UK Patent Application Number GB2517264A—Ocado Innovation Limited, hereby incorporated by reference—the storage system comprises a series of bins 10 that may further comprise delivery containers DT with customer orders contained therein or may further comprise bins 10 with inventory items awaiting picking contained therein. These different bins 10 and combinations thereof may be contained in the storage system and be accessed by the robotic load handling devices 30 as described above.

It will be appreciated that automated or semi-automated storage and retrieval systems are not limited to systems directed to groceries. For example, the technology can be applied to shipping, baggage handling, vehicle parking, indoor or hydroponic greenhouses and farming, modular buildings, self-storage facilities, cargo handling, transport switchyards, manufacturing facilities, pallet handling, parcel sortation, airport logistics (ULD) and general logistics to name but a few possible applications. It will be appreciated that storage and retrieval systems of different types will have different technical requirements.

It is against this background that the present invention has been devised.

SUMMARY

Aspects of the invention are set out in the accompanying claims.

One aim of the present application is to provide a fault or failure tolerant load handling device. Another aim of the present invention is to provide a load handling device which is able to self-recover or at least partially self-recover if a fault or failure is detected or occurs.

A load handling device is provided for lifting and moving storage containers (10) stacked in a grid framework (14) structure comprising: a first set of parallel rails or tracks (22a) and a second set of parallel rails or tracks (22a) extending substantially perpendicularly to the first set of rails or tracks (22b) in a substantially horizontal plane to form a grid pattern comprising a plurality of grid spaces, wherein the grid is supported by a set of uprights (16) to form a plurality of vertical storage locations beneath the grid for containers (10) to be stacked between and be guided by the uprights in a vertical direction through the plurality of grid spaces, the load handling device comprising: a body mounted on a first set of wheels (116) being arranged to engage with the first set of parallel tracks (22a) and a second set of wheels being arranged to engage with the second set of parallel tracks (22b), and a drive assembly for driving the load handling device in a first direction along the first set of parallel tracks or driving the load handing device in a second direction along the second set of parallel tracks, wherein the drive assembly comprises: at least two motors for driving respective wheels of the first set of wheels; at least two motors for driving respective wheels of the second set of wheels, wherein each motor is positioned such that its drive shaft is parallel and non-coaxially arranged with respect to the axis of rotation of its respective wheel; and, a number of gear arrangements corresponding to the number of motors for transferring drive from the motors to their respective wheels.

In this way, the load handing device is able to manoeuvre along the tracks to all of the grid spaces by selectively powering or driving the first set of wheels and the second set of wheels to move in a first or x-direction or to move in a second or y-direction. The driven wheels may be driven in forward and reverse directions. The flexibility in the direction of travel and the grid pattern itself means that the load handling device is not required to travel a specific route to a particular grid location, instead the load handling device can manoeuvre around obstacles on the grid, for example, other load handing devices.

Another advantage of the arrangement of the drive motors is that the drive shaft may be significantly longer than other motor arrangements that do not extend across the load handling device body, such as a direct drive hub motor arrangement.

It will be appreciated that by having at least two motors for driving the load handling device in the first direction or x-direction and having at least two motors for driving the load handling device in the second or y-direction, there is redundancy for driving the load handling devices in both direction. Advantageously, even if there is a failure of one motor for a set of wheels, the load handling device will still be able to "limp home" to the edge of the grid or to a repair area. Advantageously, this means that the grid may continue to be fully operational while the faulty load handling device is recovered and repaired and reduces the needed for stoppages of grid operation while a faulty load handling device is recovered. Advantageously this helps to ensure that the grid may operate efficiently.

Optionally, each motor is arranged on a face of the body perpendicular to the face associated with its respective wheel.

An advantage of the drive motors being arranged on a face perpendicular to the wheel that they are driving is that motor may be arranged within the face of the load handing device, i.e. extending across the periphery of the load handling device. This arrangement means that the central portion of the body is left open or clear from drive motors or drive shafts, leaving a cavity. The cavity may be used for housing other components of the load handing device. Or the cavity may be used for receiving a lifted storage container, and housing a lifted storage container while the load handling device manoeuvres on the grid to another location.

The first set of wheels may comprise two wheels on a first face of the load handling device, and two wheels on a first opposed face of the load handing device; the second set of wheels may comprise two wheels on a face of the load handling device perpendicular to the first face of the load handling device, and two wheels on a second opposed face of the load handing device; and at least one wheel on each face of the load handling device may be driven by a respective motor.

The wheels without a drive motor, or un-driven wheels, may be idler wheels allowed to freely rotate when the load handling device is driven by other wheels of the set of wheels. In this way, the number of motors required is reduced thereby saving on costs in capital, costs in space on the load handling device, and the amount of communication and control required to synchronise the parts in order to operate the load handling device to move around the grid.

It will be appreciated that one wheel on each side of the load handling device is driven. The driven wheels on the opposed sides may be diagonally opposite each other to advantageously limit any twisting forces that might arise on the load handling device when it is being drive. Accordingly, this makes it less likely that the load handling device would wobble over the track limits and less likely that the load handling device would tip over when being driven.

Each wheel of the first set of wheels and the second set of wheels may be driven by respective motors.

It will be appreciated that further redundancy is introduced when each of the wheels may be driven by a respective motor. Further, it will be appreciated that it may be possible to drive the load handling device using four motors for each direction, at twice the speed compared with two motors for each direction. Still further, it will be appreciated that by driving all the wheels in each direction the possibility of introducing twisting forces on the load handling device when it is being driven are negated.

At least one of the first set of wheels and at least one of the second set of wheels may be driven by a motor(s) powered by a first power source, and at least one of the first set of wheels and at least one of the second set of wheels may be driven by a motor(s) powered by a second power source, and the first power source and the second power source are independent or separate.

In this way, only the wheels required to be driven may be driven at any time. For example, if all of the wheels are engaged with the track then, it will be appreciated, that the load handling device could not move in the first direction nor the second direction and therefore none of the wheels should be driven. In this arrangement, the load handling device may be considered to be in a "parked" configuration. Alternatively the load handling device may be considered to be parked when one set of wheels is engaged with the track, but the engaged set of wheels are not driven. Advantageously a parked configuration the load handling device may be stopped whilst on the grid. In some circumstances it may be necessary to stop all the load handling devices operating on the grid to reduce risk to carry out work on the grid, for example.

It will be appreciated that only the wheels required for a particular direction of travel may be driven. Advantageously, this may reduce the load on the power supply of the load handling device.

Two of the first set of wheels and two of the second set of wheels are driven by a motors powered by a first power source, and two of the first set of wheels and at least one of the second set of wheels are driven by a motor(s) powered by a second power source. The first power source and or the second power source is sub-divided into at least two independent parts.

In this way, even if there is a fault with one power source or sub-part of a power source the load handling device may continue to operate in a reduced capacity.

The load handling device further may comprise means for selectively driving the first set of wheels or the second set of wheels. Thus, it is not necessary for all of the wheels to be driven at a particular time.

The load handling device may further comprise a direction change assembly for selectively engaging the first set of wheels and or the second set of wheels respectively with the first set of tracks and the second set of tracks.

Advantageously each set of wheels may be selectively engaged with the tracks to enable movement of the load handling device in first and second directions. The load handling device may also be moved into a parked configuration where both the first set of wheels and the second set of wheels are engaged with the tracks.

The direction change assembly may comprise: a first set of direction change pulleys for the first set of wheels; and a second set of direction change pulleys for the second set of wheels, wherein the direction change pulleys are operate to selectively lift the first set of wheels or the second set of wheels to disengage the first set of wheels or the second set of wheels from the tracks.

In this way, the direction change assembly for each of the wheels may be arranged above the wheels and move the wheels vertically to engage and disengage the wheels with the tracks. The wheels may move relative to the body of the load handling device. It will be appreciated, that at least some of the wheels will be engaged with the track at all times to support the body of the load handling device.

In this way, both the first set of wheels and the second set of wheels are arranged to move in a vertical or z-direction relative to the body of the load handling device.

The first set of pulleys and or the second set pulleys may be operated in unison for the first set of wheels or the second set of wheels, by direction a change motor for each wheel.

It will be appreciated that for the load handling device to operate effectively and efficiently, all of the wheels in each set of wheels should be lowered and or raised, or engaged and disengaged, with the tracks in unison.

The first set of wheels and the second set of wheel may move in synchronisation relative to the body to selectively engage and disengage the wheels with the tracks.

Further, it will be appreciated that it may be an advantage to move the first set of wheels and the second set of wheels synchronously so that a direction-change operation can operate in one step. Advantageously, this may reduce the time required to engage the first set of wheels and or the second set of wheels, and thereby allow the load handling device to operate more quickly.

The load handling device may further comprising a lifting assembly for lifting and or lowering a storage container from and or to a storage location beneath the grid.

Thus, the load handling device is provided means for lifting and lowering storage containers. Storage containers may be received into a cavity within the body of the load handling device so that the container may be moved over the grid to a new location. The new location may be a different storage location or the new location may be an egress location on the grid. Alternatively, the storage container may be picked-up from an ingress location on the grid and moved to a storage location. Accordingly, the load handling device is suitable for operating within a storage and retrieval system. The storage and retrieval system may be automated or semi-automated.

The load handing device may further comprising sensing means for: determining location on the grid; determining a fault or failure in the drive assembly; determining engagement of the first set of wheels or second set of wheels with the parallel tracks; determining a fault or failure in the direction change assembly; AND OR determining engagement and or disengagement of the lifting assembly with a container.

For example, sensors means might comprise an over-temperature gauge or sensor, an over-current sensor, open circuit sensors or detectors and or short circuit detectors on each of the on the drive motors, hoist, z-hoist or lift assembly motors, direction-change motors and or gripper motors; an out of balance torque on the TGA cables or mechanism; an out of level TGA detected by sensors on the cable winding mechanism; and or an out of level TGA detected by level sensors on the TGA assembly.

A method of manoeuvring a load handing device operating on a grid framework (14) structure is provided, the method comprising the steps of: selectively driving one or more motors to drive the first set of wheels or the second set of wheels in forward or reverse directions.

Optionally, the method may further comprise the steps of receiving a signal from a centralised control facility; selectively engaging the first set of wheels or the second set of wheels with the tracks; navigating the grid to a location specified by the centralised control facility, AND OR receiving a signal from a centralised control facility; controlling the direction-change mechanism based on the received signal to: (a) engage the first set of wheels with the first set of parallel tracks; (b) engage the second set of wheels with the second set of parallel tracks; OR (c) engage first and second sets of wheels with the first and second sets of parallel tracks to park the load handling device, AND OR receiving a signal from a centralised control facility; moving to a specified location on the grid; and performing a lifting operation to lift a container from a storage location beneath the grid, OR performing a lowering operation to lower a container to a storage location beneath the grid.

Thus, the load handing device may controlled to carry out lifting and moving operations on a gird-based storage and retrieval system.

A grid-based storage and retrieval system is provided, the system comprising: a grid framework (14) structure comprising: a first set of parallel rails or tracks (22b) and a second set of parallel rails or tracks (22a) extending substantially perpendicularly to the first set of rails or tracks (22b) in a substantially horizontal plane to form a grid pattern comprising a plurality of grid spaces, wherein the grid is supported by a set of uprights (16) to form a plurality of vertical storage locations beneath the grid for containers (10) to be stacked between and be guided by the uprights in a vertical direction through the plurality of grid spaces, at least one load handling device operating on the grid framework structure; and a centralised control utility for controlling the at least one load handling device(s).

The at least one load handling device may further comprise a communication means; and the centralised control utility of the storage system comprises communication means for communicating with a communication means on the at least one load handling device.

The centralised control utility remotely monitors the condition of the at least one load handling device. If a malfunction and or failure of the load handling device is detected, the load handling device may be instructed to move to a maintenance area or the edge of the grid using non-malfunctioning and non-failed means.

The centralised control utility may communicate with the at least one load handling device operating on the grid to instruct the load handling device to move to a specific location on the grid. Further the load handling device may be instructed to lift a container from a stack and move the container to another location on the grid, AND OR further instructing the load handling device to lower a container into a stack position beneath the grid.

A load handling device is provided for lifting and moving storage containers (10) stacked in a grid framework (14) structure comprising: a first set of parallel rails or tracks (22a) and a second set of parallel rails or tracks (22a) extending substantially perpendicularly to the first set of rails or tracks (22b) in a substantially horizontal plane to form a grid pattern comprising a plurality of grid spaces, wherein the grid is supported by a set of uprights (16) to form a plurality of vertical storage locations beneath the grid for containers (10) to be stacked between and be guided by the uprights in a vertical direction through the plurality of grid spaces, the load handling device comprising: a body mounted on a first set of wheels (116) being arranged to engage with the first set of parallel tracks (22a) and a second set of wheels being arranged to engage with the second set of parallel tracks (22b); and a lifting assembly comprising a sling assembly arranged to support, raise and lower a load, the sling assembly comprising: a sling extending between a support mountable to the body of the load handling device and a gripper plate for supporting the load, wherein the first end of the sling is attached to a hoist drum and the second end of the sling is attached to a hoist drum.

The lifting assembly, or TGA (tote gripper assembly) comprises a sling. The sling may be lifting tapes or wires. In normal use, typically both ends of the sling would be spooled or wound and unspooled or unwound in order to lift and lower the load. Advantageously, just one end of the sling may be spooled or unspooled allowing the lifting assembly to continue to be operational with only one hoist drum operational.

The first end of the sling may be attached to a first hoist drum and the second end of the sling is attached to a second hoist drum, and the first hoist drum is driven by a first motor and the second hoist drum is driven by a second motor.

The hoist drums may be independently operable to advantageously provide redundancy to the lifting assembly. Advantageously this may allow the load handling device to continue operating even with a fault or reduced power. It will be appreciated that this may mean that the lifting and lowering operation Both the first end of the sling and the second end of the sling may be attached to the same hoist drum, and the hoist drum is driven by one or more motors. The first motor and second motors me be independently powered by respective power supplies. The lifting assembly may comprise at least two sling assemblies.

In some arrangements, both ends of the sling may be attached to the same hoist drum. This arrangement has the advantage of taking less space. In addition, less control and communication facilities/volume may be required. This may additionally make inserting and removing the lifting assembly, and/or removing other components of the load handling device through or around the lifting assembly, easier. In some arrangements the drum may be operated by more than one motor to provide redundancy. In normal operation this would mean that a greater load could be lifted and lowered. In other circumstances, for example when a motor or power supply has a fault, then the lifting assembly may continue to be operational.

A load handling device is provided for lifting and moving storage containers (10) stacked in a grid framework (14) structure comprising: a first set of parallel rails or tracks (22a) and a second set of parallel rails or tracks (22a) extending substantially perpendicularly to the first set of rails or tracks (22b) in a substantially horizontal plane to form a grid pattern comprising a plurality of grid spaces, wherein the grid is supported by a set of uprights (16) to form a plurality of vertical storage locations beneath the grid for containers (10) to be stacked between and be guided by the uprights in a vertical direction through the plurality of grid spaces, the load handling device comprising: a body mounted on a first set of wheels (116) being arranged to engage with the first set of parallel tracks (22a) and a second set of wheels being arranged to engage with the second set of parallel tracks (22b); and a lifting assembly comprising: a disc hoist drum mounted on a support mountable to the body of the load handling device and for spooling one or more tapes; and a gripper plate for supporting a load, wherein the one or more tapes extend between the disc drum and the gripper plate.

In some arrangements, the drum may be mounted so that it appears as a disc from above i.e. with the drum axis in the z- or vertical direction. In this arrangement, the drum may have a much larger diameter than would be possible to accommodate if it were arranged with the axis in the x,y plane. Having a large diameter drum means that the drum may be directly driven by a small high RPM motor without the need for step-down gearing.

The disc drum may be driven by a single motor. The single motor may be a direct drive worm gear transfer to the disc drum, or wherein the single motor is a direct drive pulley gear transfer to the disc drum.

Advantageously, using a single motor may reduce the cost (space and capital). Using a worm gear advantageously means that the drum may be directly driven, and that the motor may be arranged in the same plane as the drum. Further, using a worm gear arrangement enables more than one motor to be arranged around the drum, and advantageously provides redundancy.

The sling or one or more tapes may be arranged in a pulley system.

A pulley system may be used to reduce the force required to lift and lower the load. Advantageously, thinner tapes or wires may be used to lift a load that would otherwise require a much stronger tape.

The lifting assembly may further comprise at least one guide or guide-roller mounted on the gripper plate. One or more of guide-rollers may be powered assistant guide-rollers. The gripper plate has at least one sensor for detecting the balance of the gripper plate and or load attached to the gripper plate.

Guides and guide rollers may assist in ensuring durable operation of the lifting assembly and load handling device by ensuring that lifting tapes or wires remain in the correct position and that spooling is neat and remains compact.

Power assistant guide-rollers may reduce the load requirement on the drum motors. Further, power assistant guide-rollers may be used to keep the load level, for example, when the load is unevenly distributed, or for example, when there is more than one drum motor and they are unevenly matched.

One or more of the guide-rollers may be movable tensioning guide-rollers.

A tensioning roller may be used to keep the lifting tape taut, especially when the rate or direction of lifting is changed.

The lifting assembly may be under control of the load handling device. The gripper plate may have at least one sensor for detecting the balance of the gripper plate and or load attached to the gripper plate. The gripper plate may comprise at least one gripper assembly, or wherein the gripper plate comprises two or more gripper assemblies, preferably wherein the gripper plate comprises four gripper assemblies. The gripper assembly(ies) may be arranged to correspond positionally to latch recesses on a storage container. The gripper assembly may further comprise guides and or guide rollers mounted on the load handling device for guiding the sling or tapes.

A method of using a load handling device is provided for lifting and moving storage containers (10) stacked in a grid framework (14) according to any preceding claim, the method comprising the steps of: receiving a signal from a centralised control facility to perform a lifting operation, manoeuvring the load handling device to the lift location, lowering the gripper plate to insert grippers into cooperating recesses of a container; causing the grippers to latch to the container; and lifting the gripper plate and container into the cavity of the load handling device OR lowering the gripper plate and container until the container is supported beneath; causing the grippers to release to the container; and lifting the gripper plate into the cavity of the load handling device.

A load handling device for lifting and moving storage containers (10) stacked in a grid framework (14) structure is provided. The load handling device comprises: a first set of parallel rails or tracks (22b) and a second set of parallel rails or tracks (22a) extending substantially perpendicularly to the first set of rails or tracks (22b) in a substantially horizontal plane to form a grid pattern comprising a plurality of grid spaces, wherein the grid is supported by a set of uprights (16) to form a plurality of vertical storage locations beneath the grid for containers (10) to be stacked between and be guided by the uprights in a vertical direction through the plurality of grid spaces, the load handling device comprising: a body mounted on a first set of wheels (116) being arranged to engage with the first set of parallel tracks (22b) and a second set of wheels (118) being arranged to engage with the second set of parallel tracks (22a), and a gripper assembly for latching to a storage container (10), wherein the gripper assembly comprises a deformable flexure mechanism movable between a locked configuration and a release configuration.

The gripper assembly may be self-locking.

The load handling device may grip onto storage containers and lift storage containers. The gripper assembly is stable in at least two configurations, and is self-locking in at least the locked configuration. The gripper operates below the fatigue limit of the material and is repeatedly movable between positions. In this way, the load handling device is able to securely and reliably grip a storage container for lifting and moving the storage container.

The bi-stable flexure may comprise: an actuator; two or more gripper-arms having hook-ends; and a number of hinge arrangements, the number of hinge arrangements corresponding to the number of gripper arms, wherein each hinge arrangement is deformable and connects the respective gripper-arms to the actuator. The hinge arrangements comprise a fulcrum, and first and second deformable sections connect to respective ends of the fulcrum. The fulcrum is substantially triangular. In the locked configuration the fulcrum engages with the gripper-arm and the compliant mechanism is open or wide; and in the release configuration the first and second sections of the hinge are flexed and the compliant mechanism is closed or narrow.

The hook-ends of the gripper arms allow the gripper to latch on to a cooperating part of a storage container, and the fulcrum means that the flexure is not able to move past the stable locked position without failure of the gripper. Thus, the configuration of the gripper assembly itself ensures that the gripper is reliably securable to the storage container for the purpose of lifting and moving the storage container.

The hinge arrangements may be connected to the gripper-arms spaced apart from the hook-ends and the fulcrum may extend above the line between the first and second hinge arrangements, or the fulcrum extends below the line between the first and second hinge arrangements. The gripper assembly may comprise two or more flexure mechanisms. The gripper assembly may comprise four flexure mechanisms.

It will be appreciated that the specific arrangement will depend on the intended use of the gripper assembly, and the intended scope is not limited to the specific examples disclosed herein.

The load handling device may further comprise a means for lifting storage containers, wherein the means for lifting storage containers comprises a gripper plate and the gripper assembly is mounted on the gripper plate. The means for lifting storage containers may be releasably mountable on the body of the load-handling device. Lifting tapes may be attached to the gripper-arms.

The flexure mechanism may be made using additive manufacturing.

A grid-based storage and retrieval system is provided, the system comprising: a grid framework (14) structure comprising: a first set of parallel rails or tracks (22b) and a second set of parallel rails or tracks (22a) extending substantially perpendicularly to the first set of rails or tracks (22b) in a substantially horizontal plane to form a grid pattern comprising a plurality of grid spaces, wherein the grid is supported by a set of uprights (16) to form a plurality of vertical storage locations beneath the grid for containers (10) to be stacked between and be guided by the uprights in a vertical direction through the plurality of grid spaces, at least one load handling device operating on the grid framework structure; and a centralised control utility for controlling the at least one load handling device(s).

The at least one load handling device may further comprise a communication means; and the centralised control utility of the storage system comprises communication means for communicating with a communication means on the at least one load handling device.

The centralised control utility remotely monitors the condition of the at least one load handling device.

If a malfunction and or failure of the load handling device is detected, the load handling device may be instructed to move to a maintenance area or the edge of the grid using non-malfunctioning and non-failed means.

The centralised control utility may communicate with the at least one load handling device operating on the grid to instruct the load handling device to move to a specific location on the grid. Further the load handling device may be instructed to lift a container from a stack and move the container to another location on the grid, AND OR further instructing the load handling device to lower a container into a stack position beneath the grid.

Other aspects and advantages will become apparent from the following description.

The invention will now be described with reference to the accompanying diagrammatic drawings in which.

Figure 1:
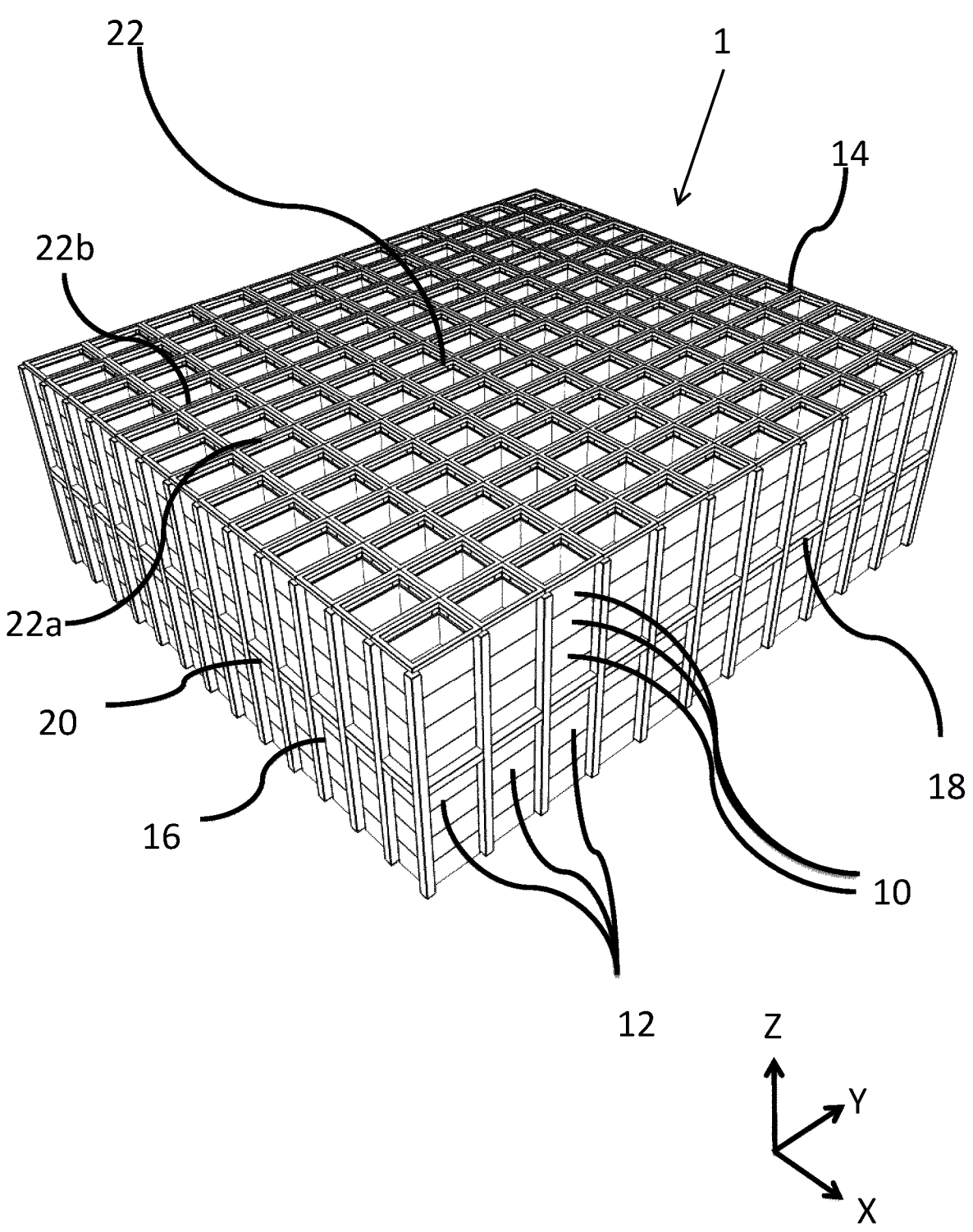
FIG. 1 is a schematic, perspective view of a known frame structure for housing a plurality of stacks of bins in a storage system.
Figure 2:
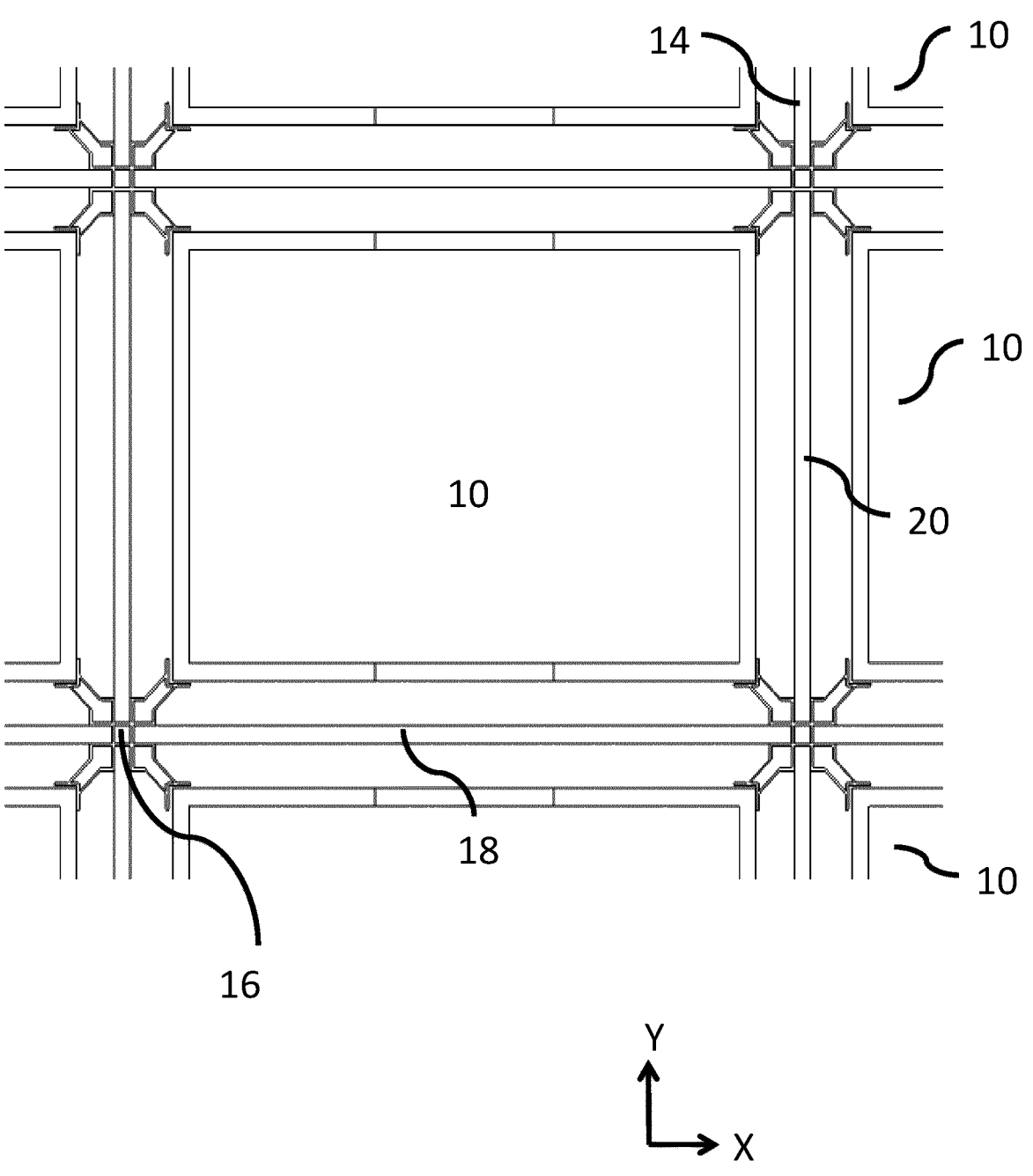
FIG. 2 is a schematic, plan view of part of the frame structure of FIG. 1.
Figure 3:
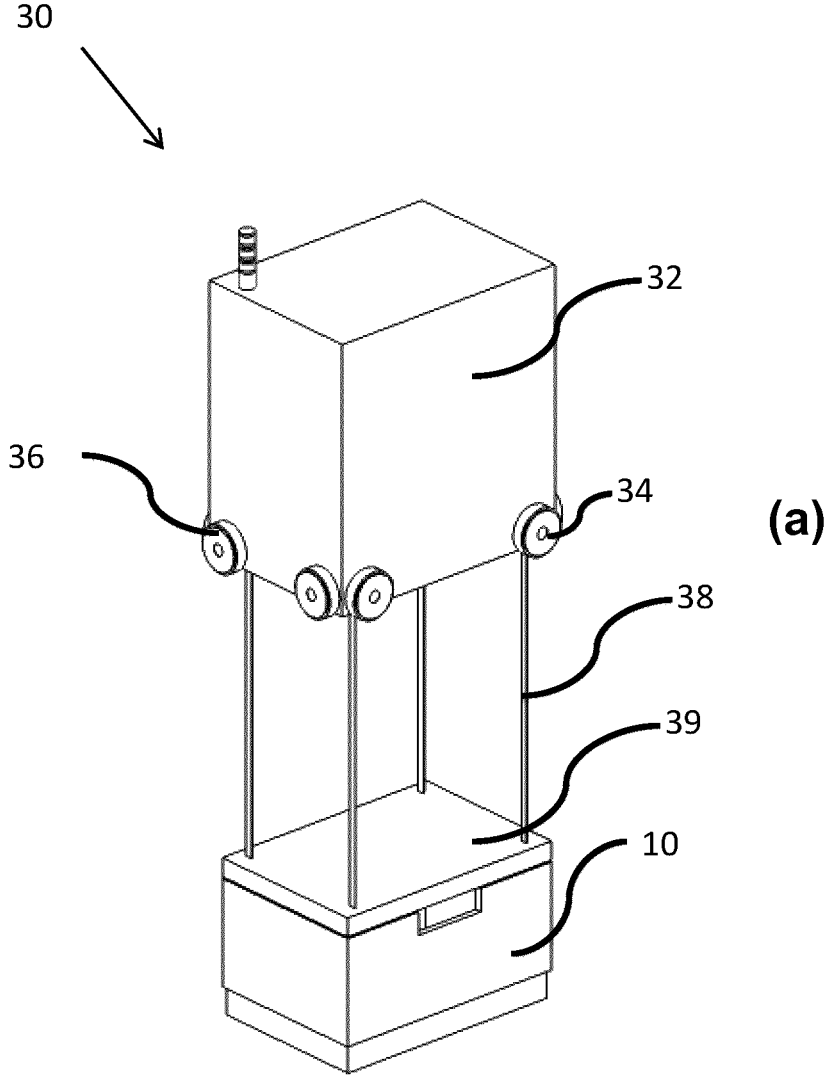
Figure 3:
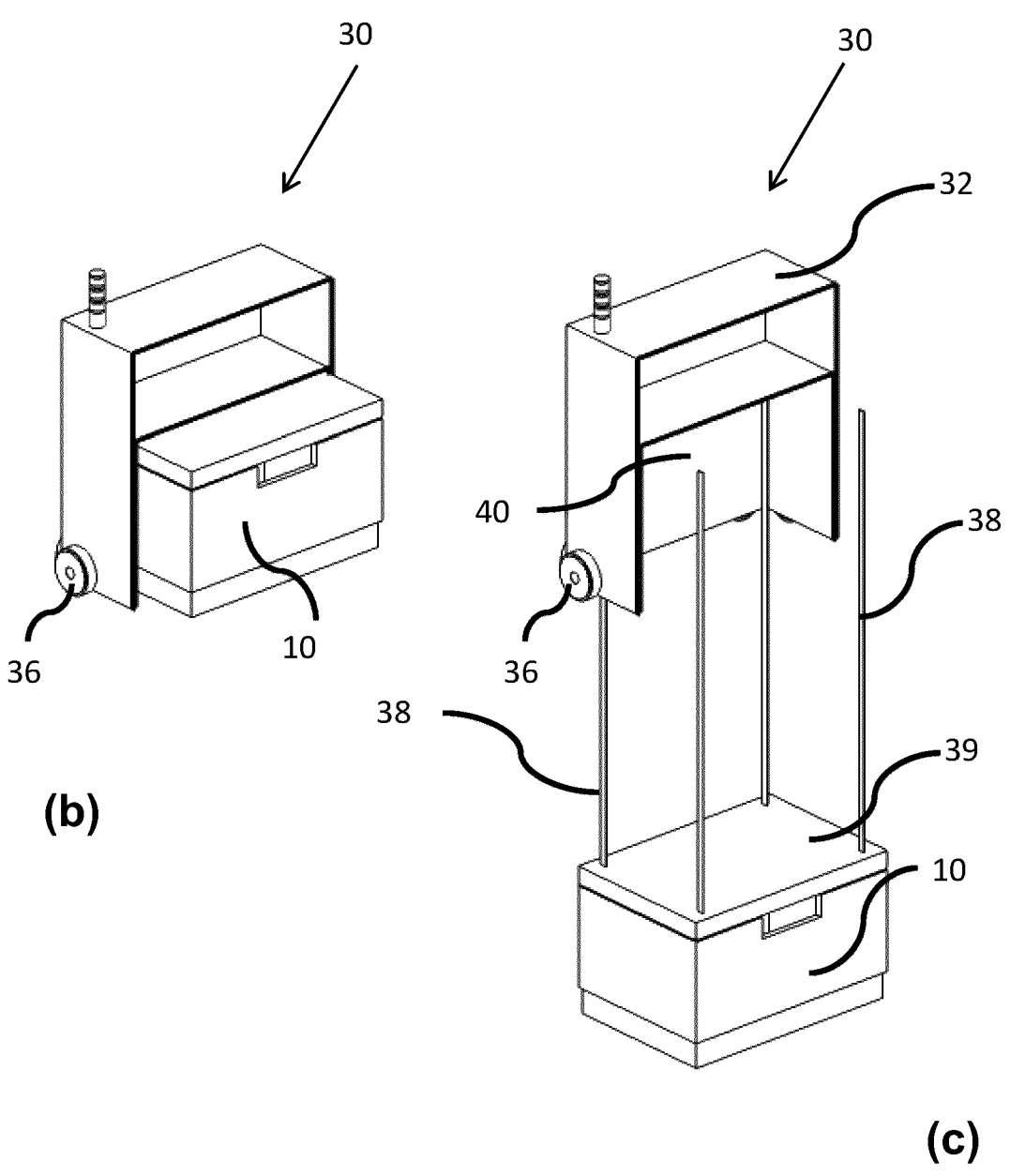
Figure 4:
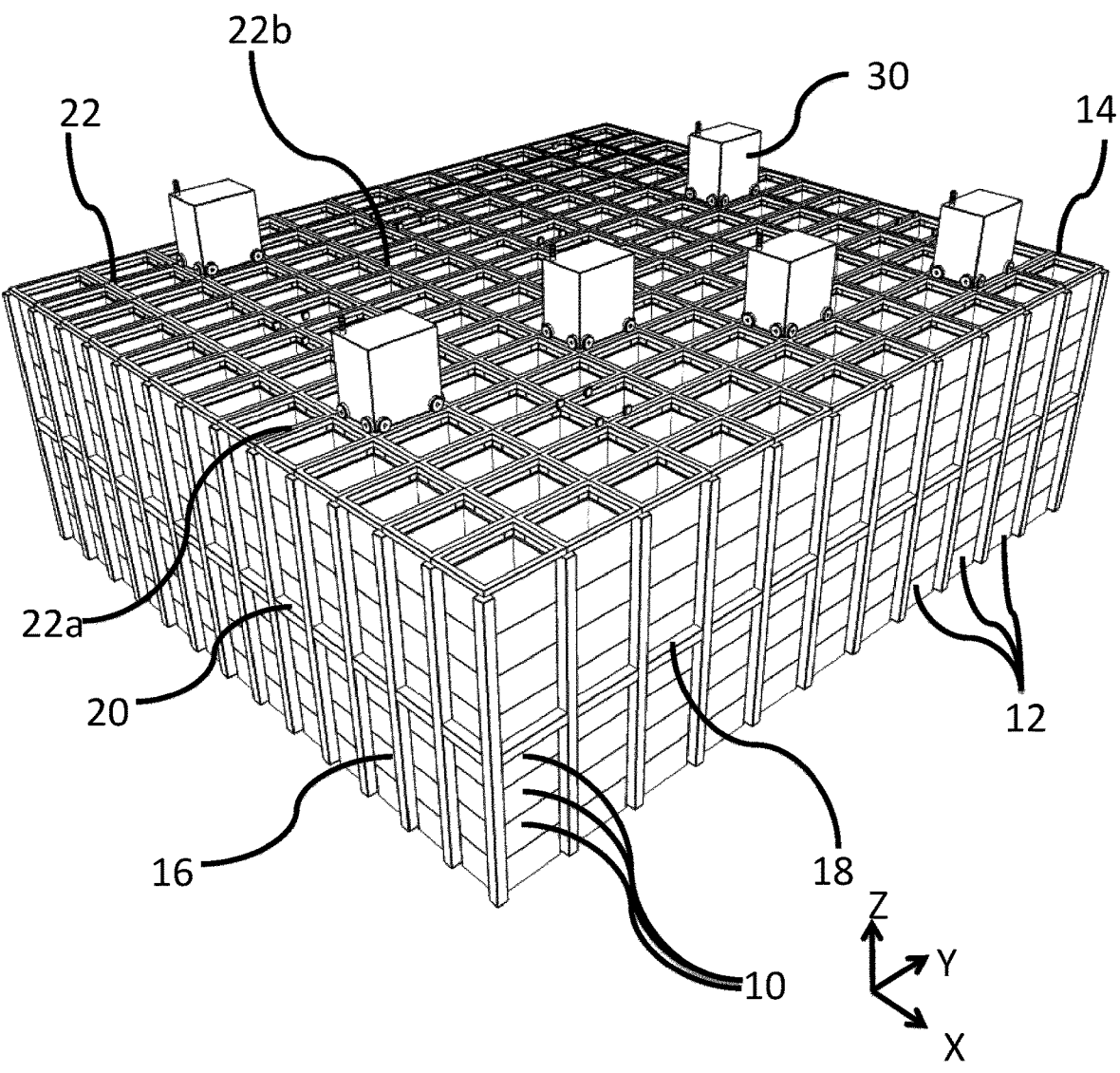
Figure 5:
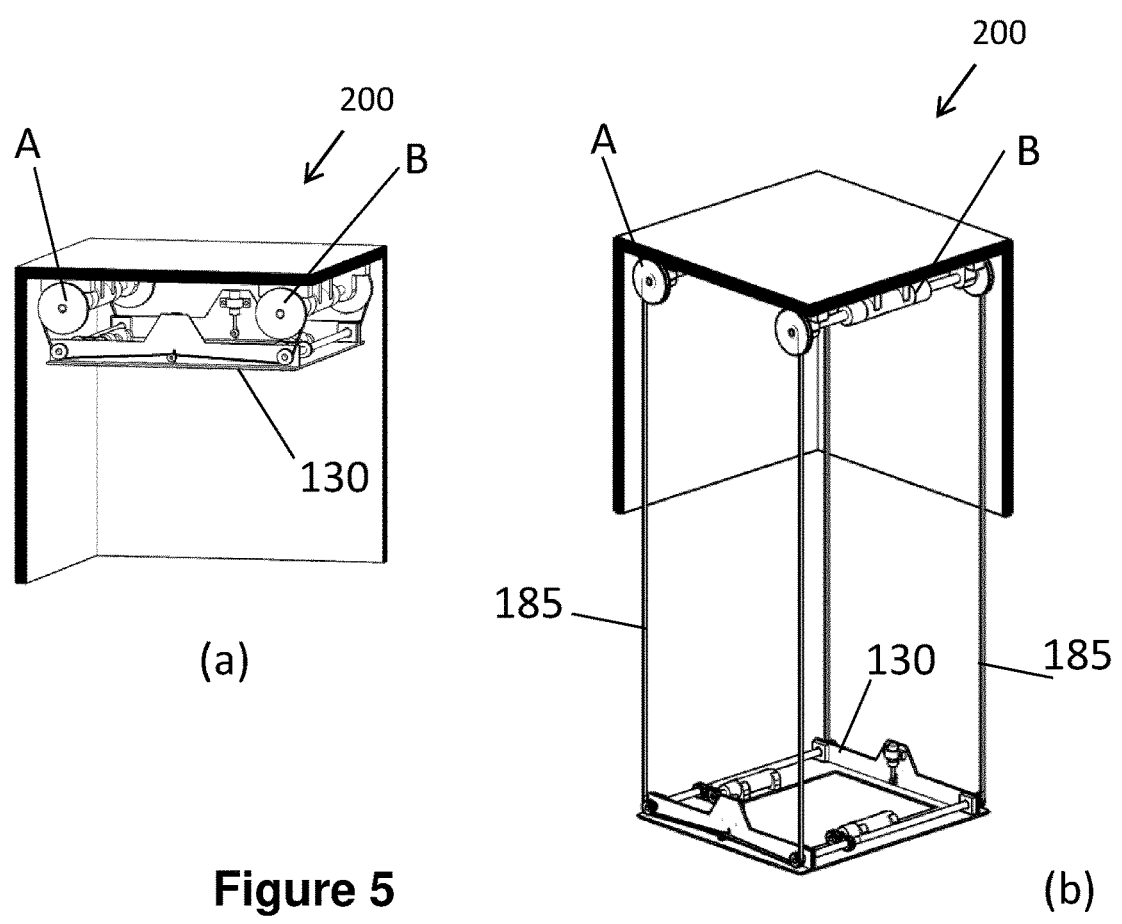
Figure 6:
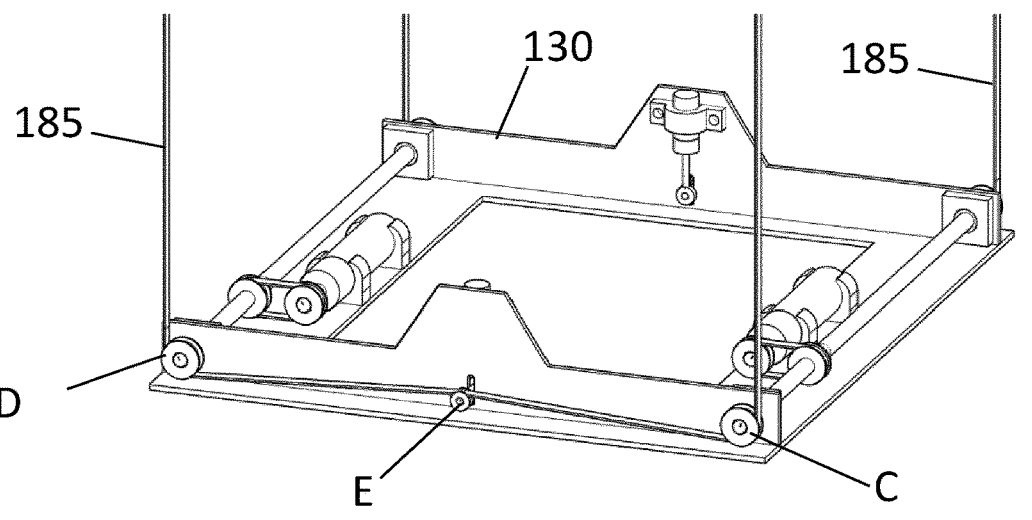
Figure 7:
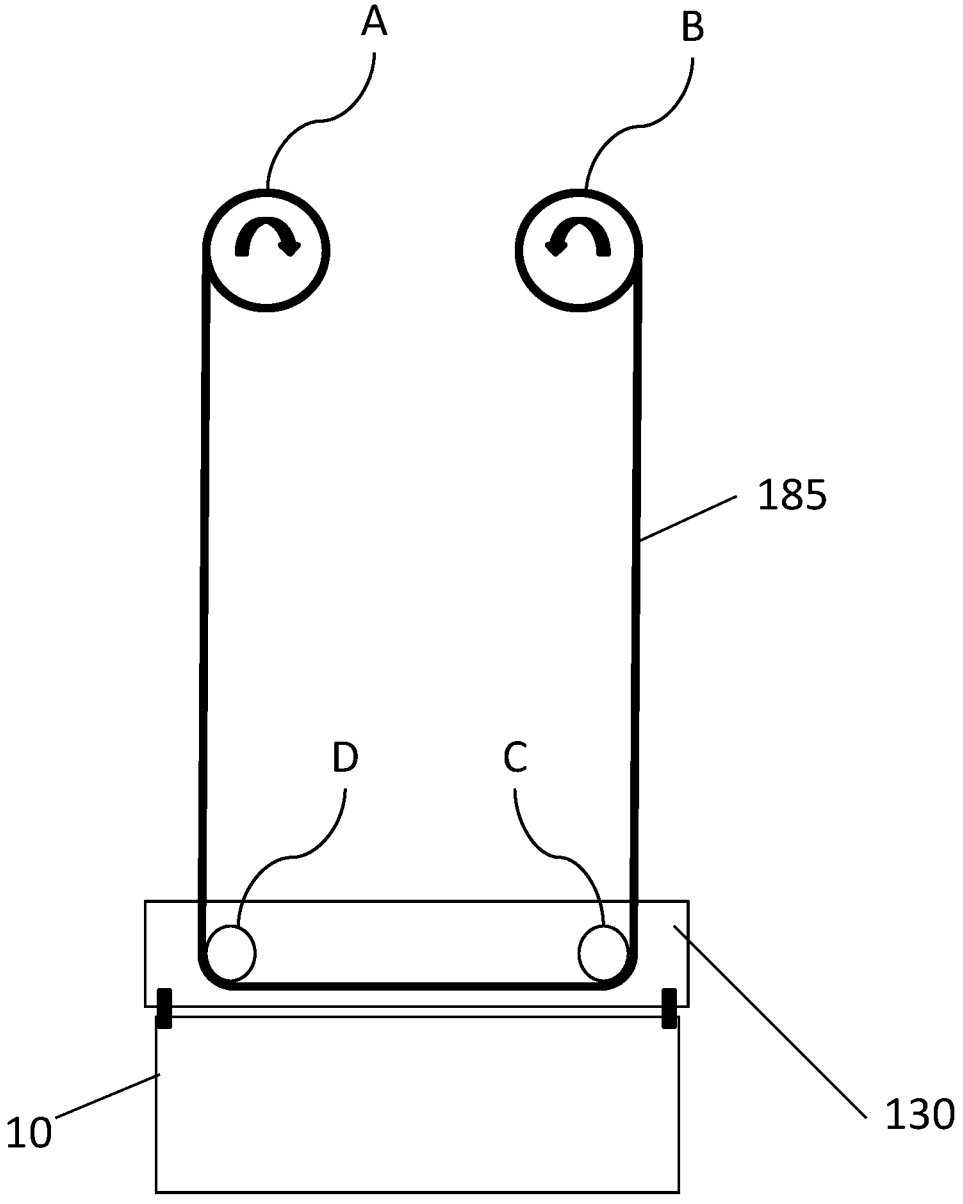
Figure 8:
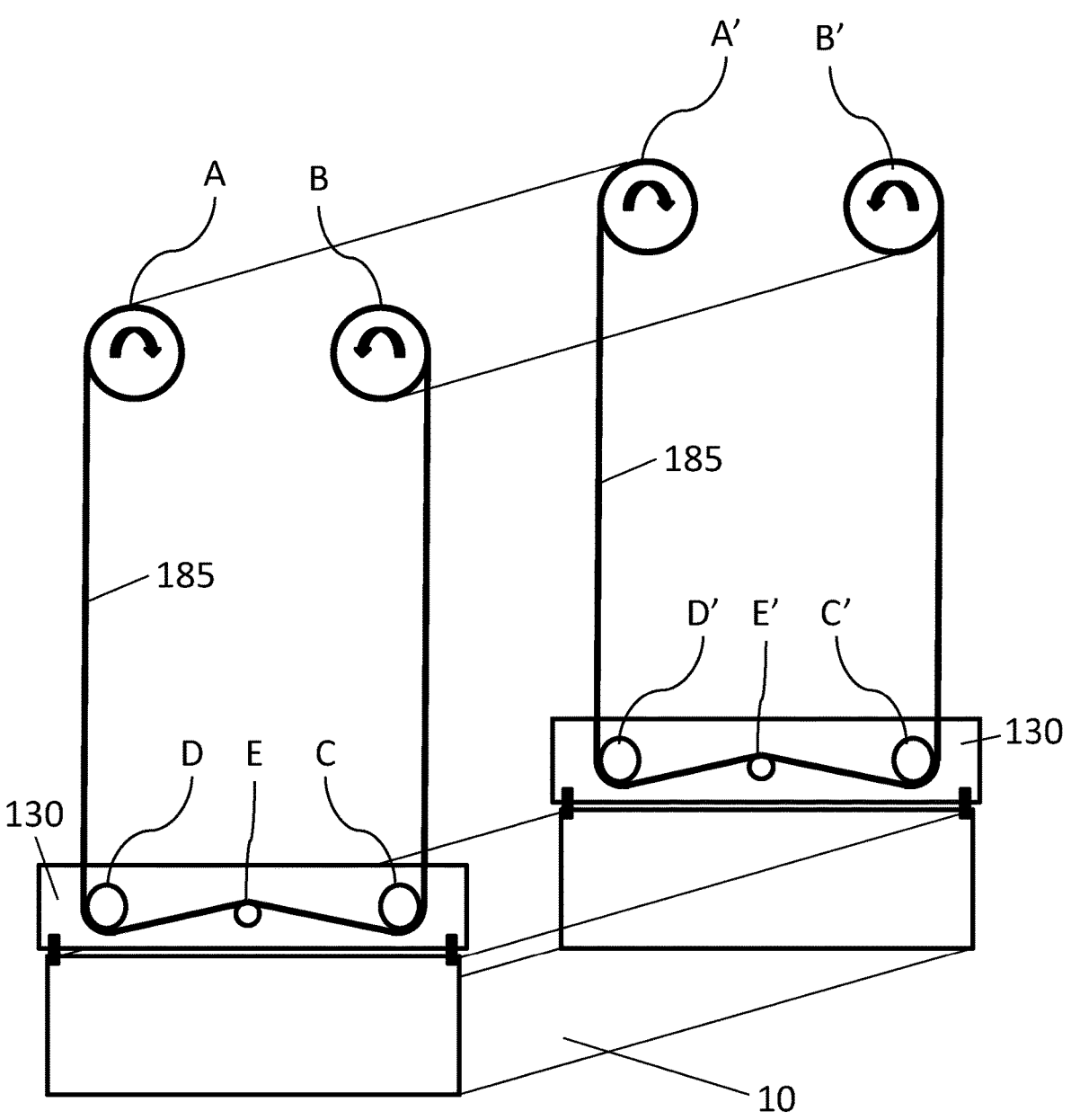
Figures 9, 10:
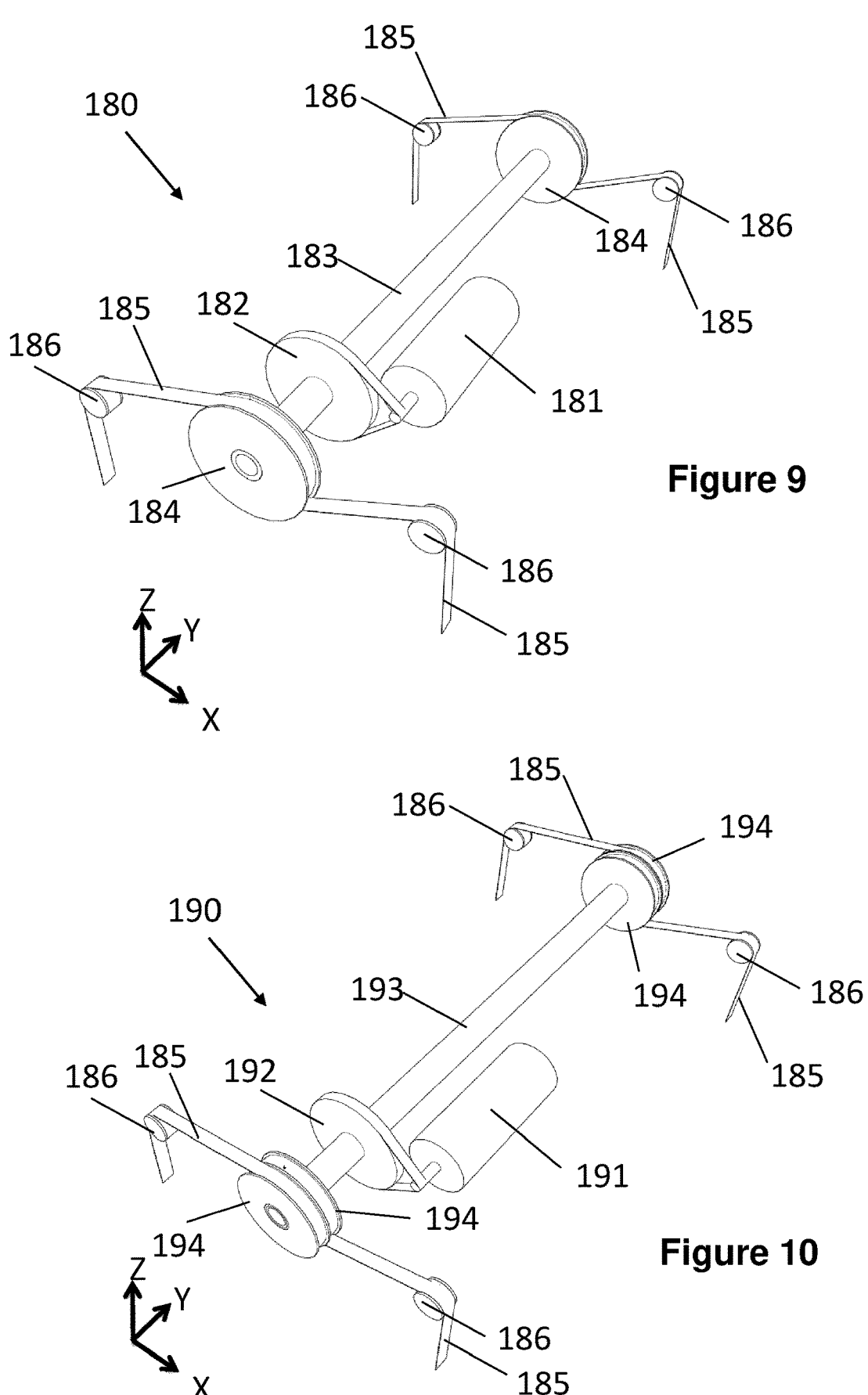
Figure 11:
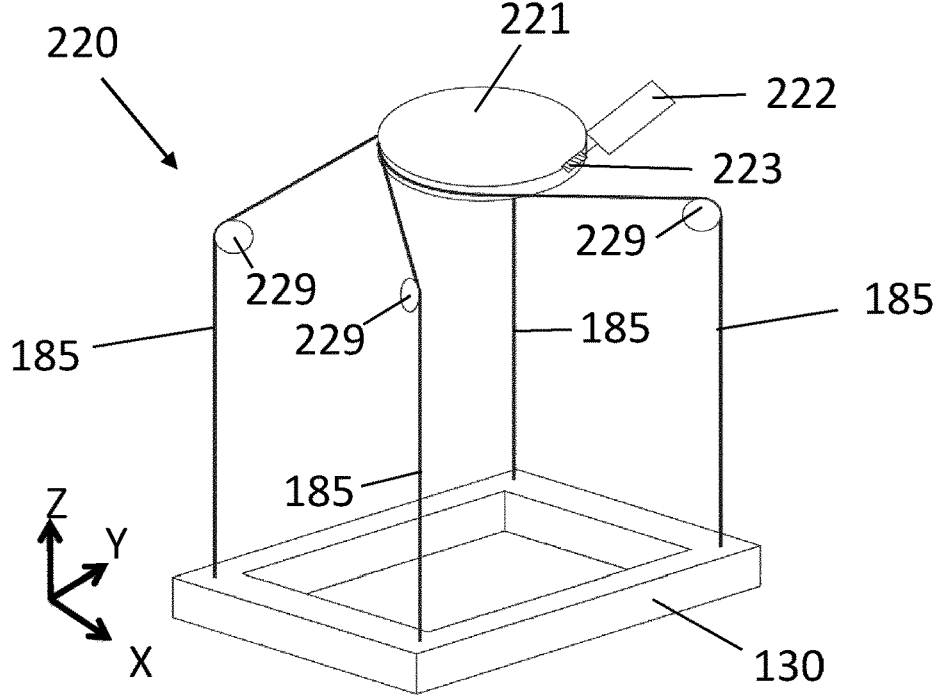
Figure 12:
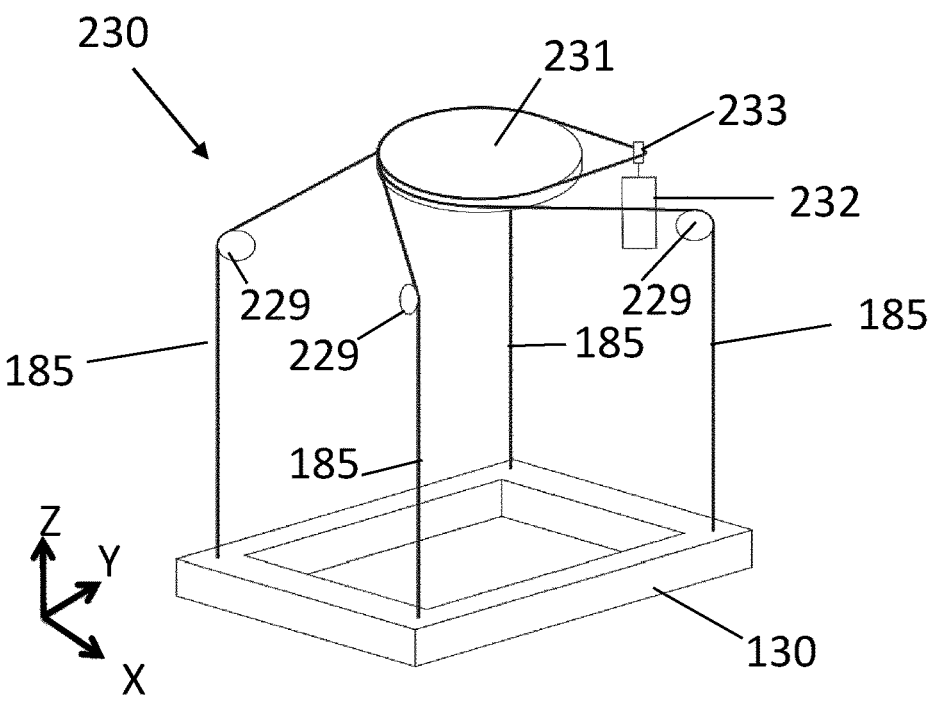
Figure 13:
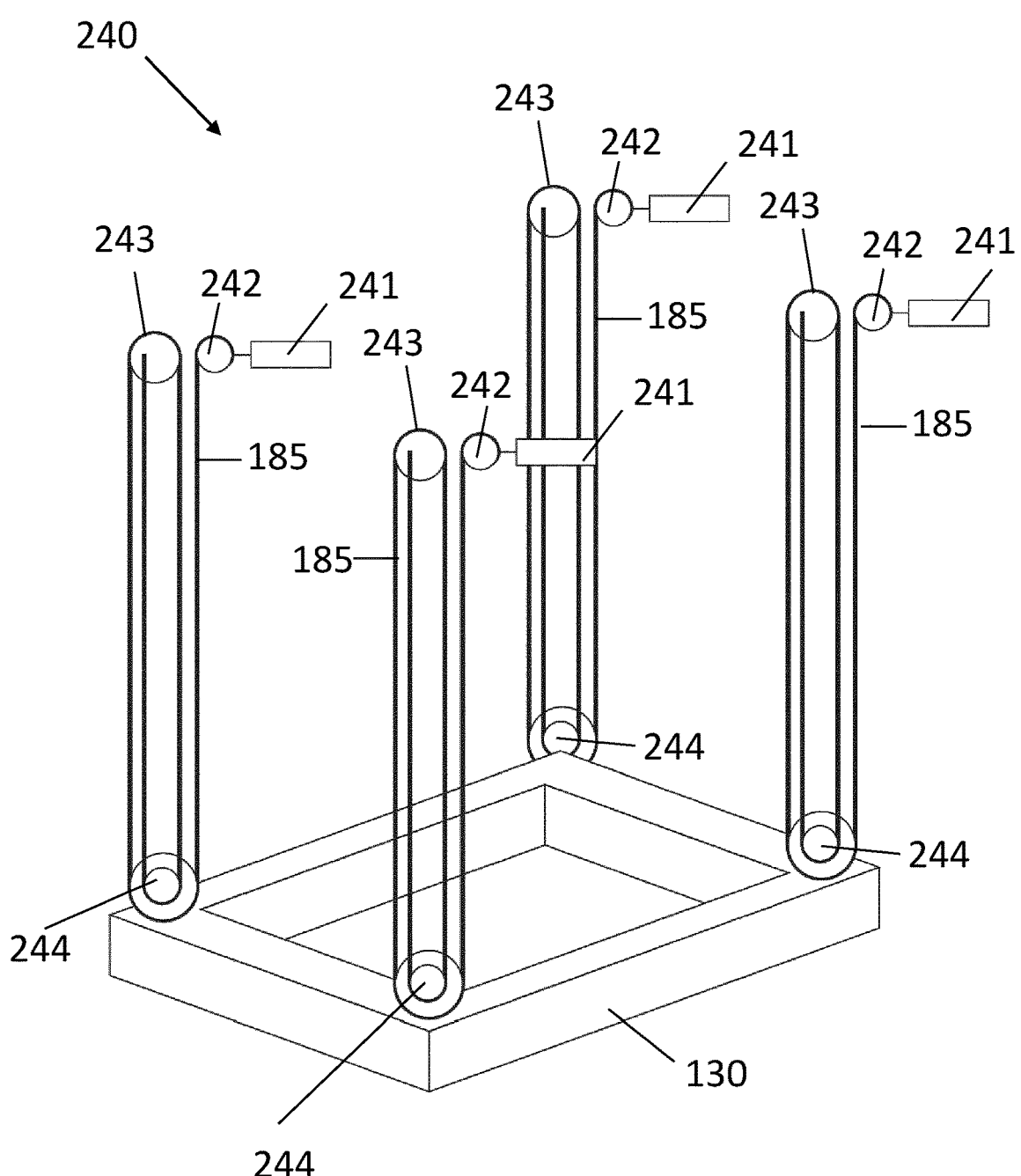
Figure 16:
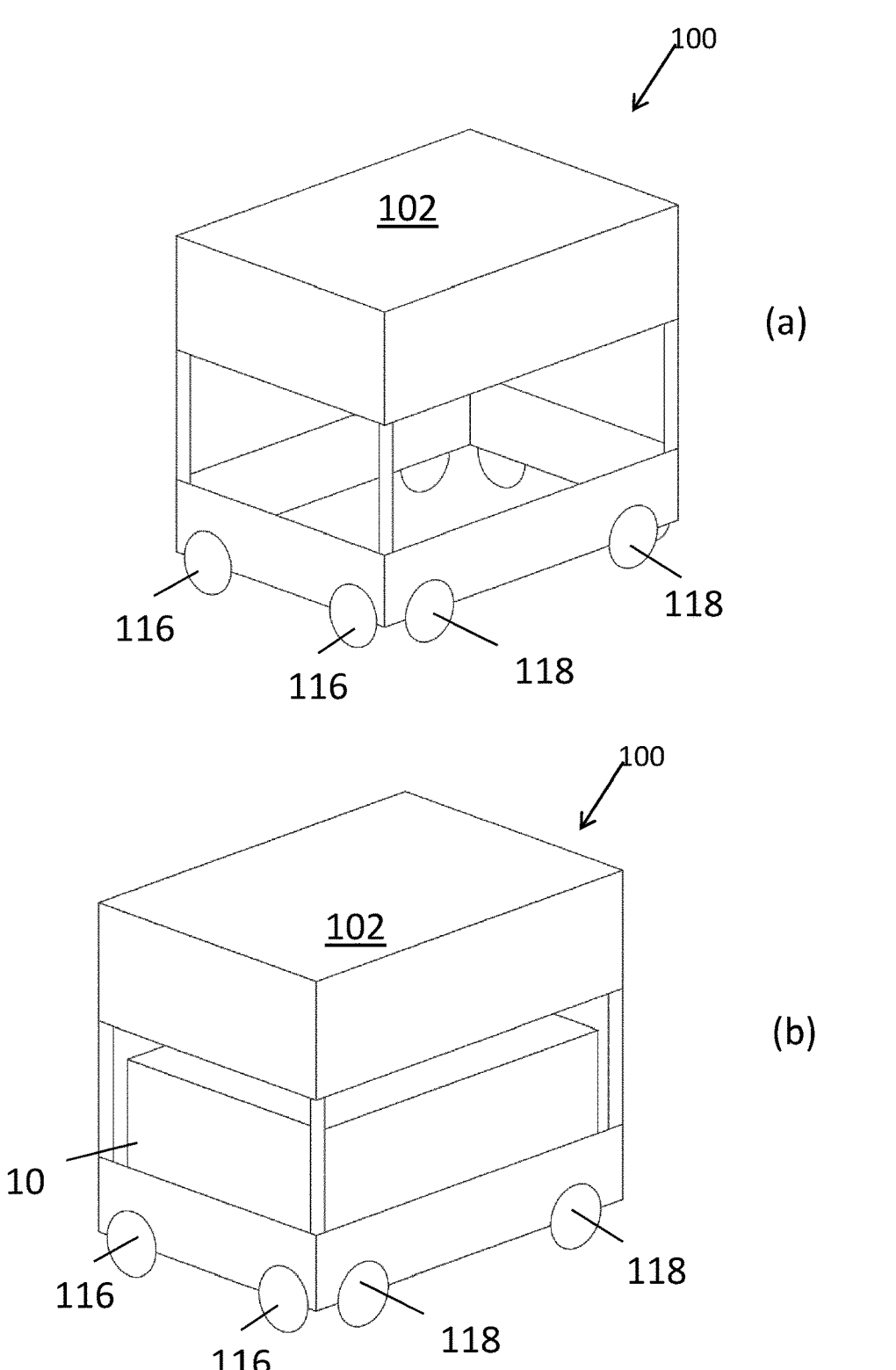
Figure 17:
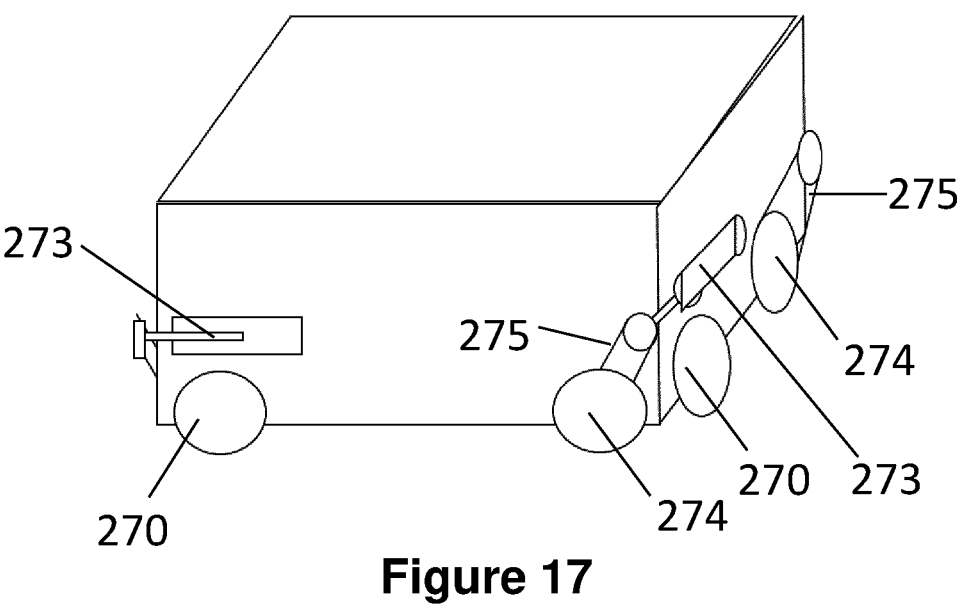
Figure 18:
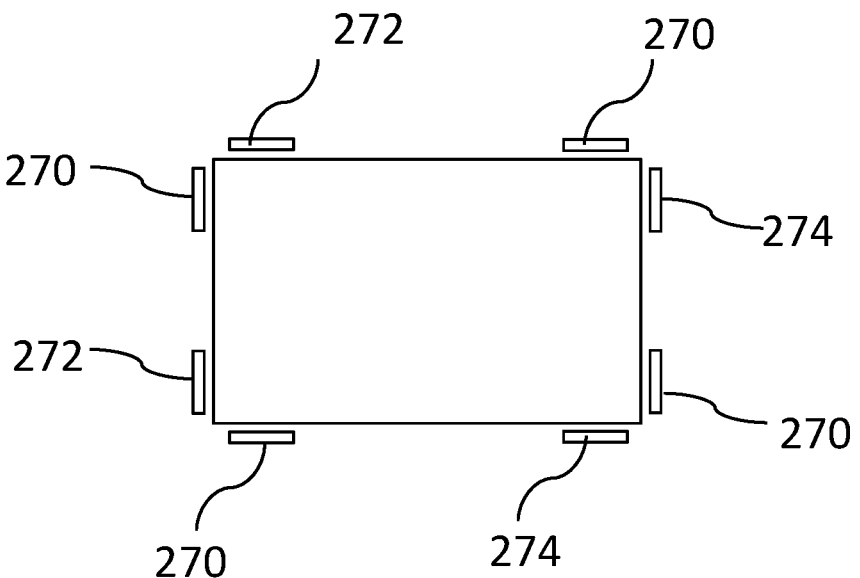
Figure 19:
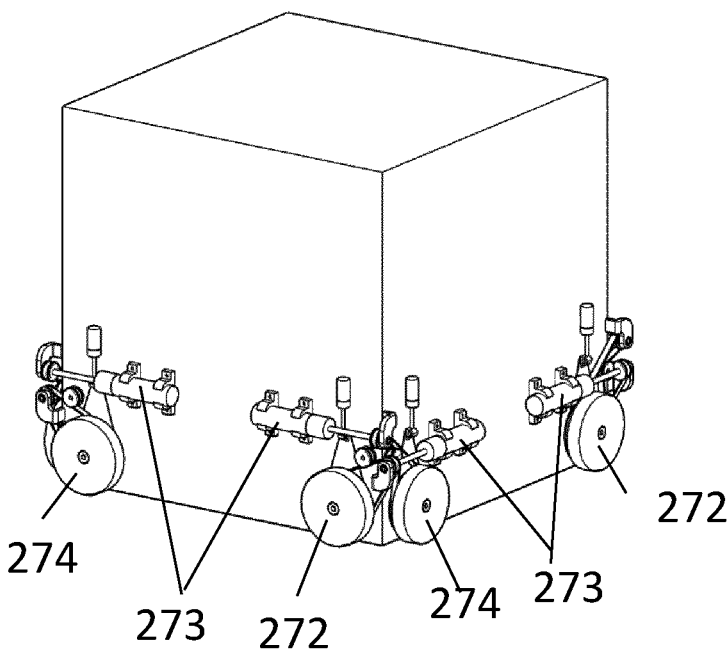
Figure 20:
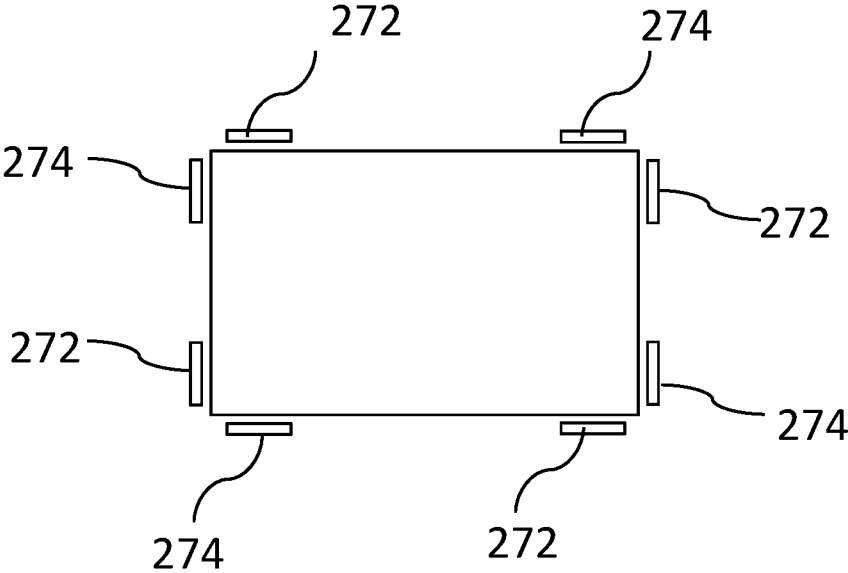
Figure 21:
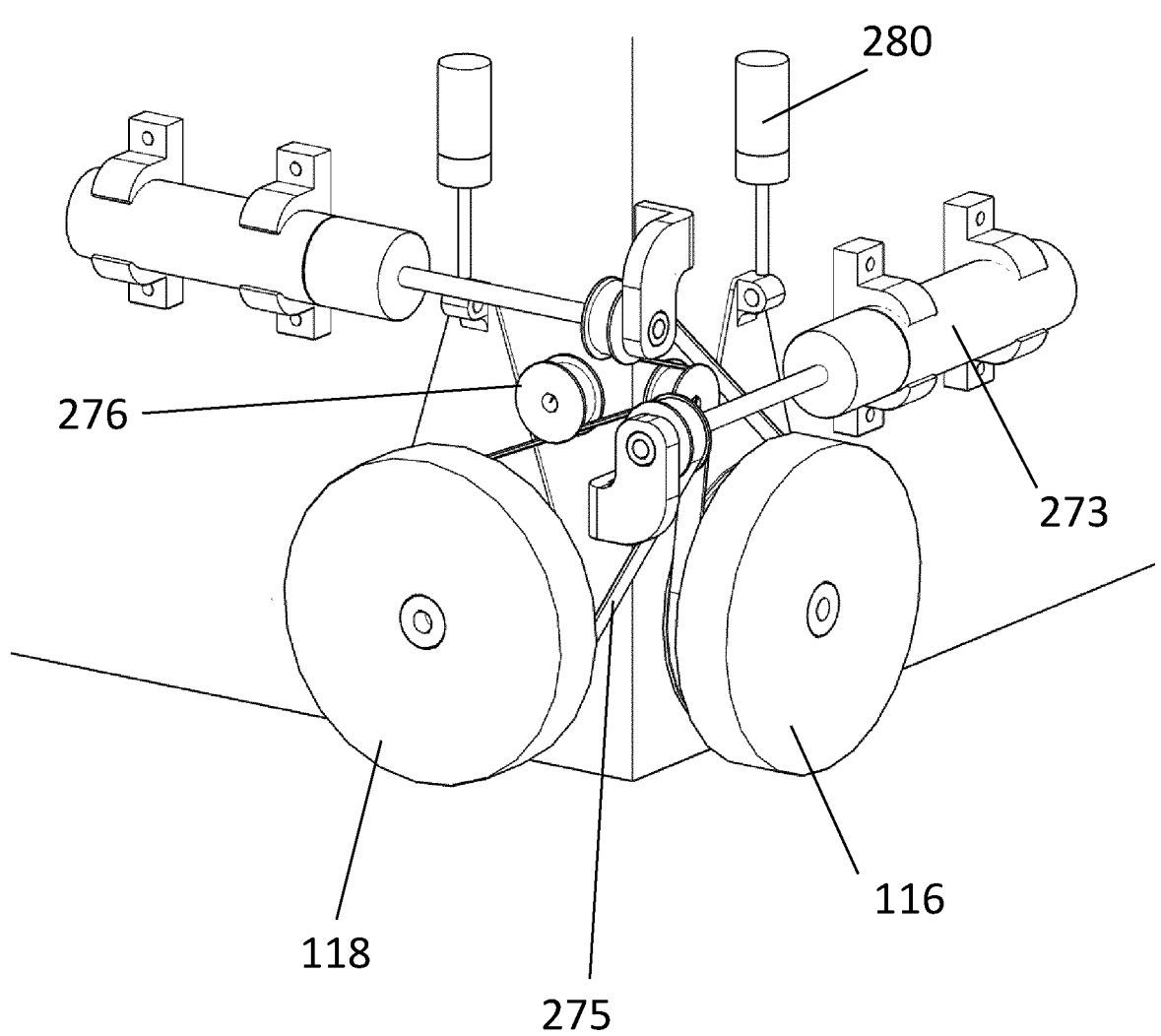

FIGS. 3(a) and 3(b) are schematic, perspective views of a known robotic load handling device for use with the frame structure of FIGS. 1 and 2, and FIG. 3(c) is a schematic perspective view of the known load handling device in use lifting a bin;

FIG. 4 is a schematic, perspective view of a known storage system comprising a plurality of load handling devices of the type shown in FIGS. 3(a), 3(b) and 3(c), installed on the frame structure of FIGS. 1 and 2;

FIG. 5(a) shows a lifting assembly where a gripper plate is hoisted; FIG. 5(b) shows the lifting assembly where the gripper plate is lowered;

FIG. 6 shows the gripper plate of FIG. 5 in more detail;

FIG. 7 shows a schematic illustration of a single sling lifting assembly;

FIG. 8 shows a schematic illustration of a coupled pair of sling lifting assemblies;

FIG. 9 shows a schematic perspective view of a wheel drum lifting mechanism;

FIG. 10 shows a schematic perspective view of an alternative wheel drum lifting mechanism;

FIG. 11 shows a schematic perspective view of a disc drum lifting mechanism;

FIG. 12 shows a schematic perspective view of an alternative disc drum lifting mechanism;

FIG. 13 shows a schematic perspective view of a pulley system lifting assembly;

FIG. 14(a) illustrates a single z,x- or z,y-plane of a pulley system lifting assembly, and FIG. 14(b) is a perspective view illustrating two z,x- or z,y-planes of the pulley system lifting assembly;

FIG. 15(a) shows a schematic illustration of a gripper assembly in a locked configuration, and FIG. 15(b) shows a schematic illustration of a gripper assembly in release configuration;

FIG. 16(a) illustrates a load handling device without a container lifted into the cavity; and FIG. 16(b) illustrates the load handling device with a container lifted into the cavity;

FIG. 17 illustrates a perspective view of a four wheel drive arrangement;

FIG. 18 illustrates a schematic x,y-plane view of a four wheel drive arrangement;

FIG. 19 illustrates a perspective view of an eight wheel drive arrangement;

FIG. 20 illustrates a schematic x,y-plane view of an eight wheel drive arrangement FIG. 21 illustrates a perspective view of a detailed section of an eight wheel drive arrangement, and direction-change assembly.

DETAILED DESCRIPTION

In this document, the word "comprise" and its derivatives are intended to have an inclusive rather than an exclusive meaning. For example, "x comprises y" is intended to include the possibilities that x includes one and only one y, multiple y's, or one or more y's and one or more other elements. Where an exclusive meaning is intended, the language "x is composed of y" will be used, meaning that x includes only y and nothing else.

In this document, the language "movement in the n-direction" (and related wording), where n is one of x, y and z, is intended to mean movement substantially along or parallel to the n-axis, in either direction (i.e. towards the positive end of the n-axis or towards the negative end of the n-axis).

In this document, the word "connect" and its derivatives are intended to include the possibilities of direct and indirection connection. For example, "x is connected to y" is intended to include the possibility that x is directly connected to y, with no intervening components, and the possibility that x is indirectly connected to y, with one or more intervening components. Where a direct connection is intended, the words "directly connected", "direct connection" or similar will be used. Similarly, words such as "support", "mount" and their derivatives are intended to include the possibilities of direct and indirect contact.

In this document, some words such as "load handling device", "vehicle" and "bot" are used interchangeably. Similarly, words "body", "frame" and "skeleton" of the load handing device; "rails" and "tracks" of the storage frame; "bin", "container", or "tote" of the storage system. "DT" or "delivery tote" is a tote which contains completed or partially completed orders. "ST" or "storage tote" is a tote which contains items being stored in the storage and retrieval system. Similarly, "tapes", "ropes" and "wires" are used interchangeably.

The load handling devices and associated methods disclosed herein are intended for operation on a storage and retrieval system as described above in connection with the prior art. The storage and retrieval system may be modified to accommodate the load handing devices described here. Further, the load handling devices operating on the grid of the storage and retrieval system are intended to be operated with or at the same time as other devices operating on the grid. The devices operating on the grid may be all of the same type, or more than one type of device may be operated on the grid at the same time.

The load handling devices described herein are intended to have at least some fault tolerant characteristics.

A load handling device comprises a skeleton 102 or frame which houses the other components of the load handling device, for example, the battery and associated electronics, controllers and communications devices, motors for driving wheels, motors for driving the lift assembly, and other sensors and systems. The skeleton 102 comprises a recess, sized to accommodate a container or bin when it is lifted by the lift assembly.

As noted above, with reference to other load handling devices, each load handling device is arranged to travel in the x- and y-directions on the rails 22 of the framework 14, above the stacks 12 of containers or bins.

Each load handling device is fitted with two sets of wheels 116, 118, which run on rails provided at the top of the frame of a storage system of the type described above. At least one wheel of each set of wheels 116, 118 is driven to enable movement of the load handling device in x- and y-directions respectively along the rails. The two sets of wheels 116, 118 are arranged around the periphery of a skeleton 102 of the load handling device. As will be explained below, one of the first or second set of wheels 116, 118 can be moved vertically to lift them clear of the rails leaving the other of the first or second set of wheels 116, 118 in contact with the rails, thereby allowing the load handing device to change direction. In some instances, both sets of wheels 116, 118 may be in contact with the rails at the same time.

As noted above, the load handling devices for operating on a storage and retrieval system typically comprise a space or cavity for receiving a container. The cavity is sized such that enough of a container can fit inside the cavity to enable the load handling device to move across the grid on top of storage framework without the underside of the container catching on the grid or another part of the storage framework. When the load handling device has reached its intended destination, the container-lifting mechanism controls lift tapes to lower the gripper assembly and the corresponding container out of the load handling device and into the intended position.

The intended position may be a stack of containers or an egress point of the storage framework, or an ingress point of the storage framework if the load handling device has moved to collect a container for storage in the storage framework. A lifting assembly may sometimes be referred to as a TGA (Tote Gripper Assembly).

FIGS. 5-8 show a representation of a lifting assembly 200 of a load handling device for raising a container into or lowering the container from a cavity of the load handling device. The lifting assembly comprises two hoist drums A, B. Each hoist drum A, B is driven by respective motors, and the motors are independently powered by respective power supplies.

A first end of a lifting tape is attached to hoist drum A, and the second end of the lifting tape is attached to hoist drum B such that the lifting tape makes a sling between the hoist drums A, B. In normal use, when the hoist drums A, B are made to rotate by their respective motors, the lifting tape wraps around the hoist drums A, B thereby lifting a weight or payload supported by the sling arrangement.

At the lower end of the sling arrangement, the lifting tape is guided by guide-rollers C, D, E mounted on a gripper plate. The gripper plate is for gripping a container or bin with gripper assemblies as described in more detail below. The guide-rollers C, D may be independently powered to assist the hoist drums A, B. In normal use, guide-rollers C, D may be un-powered and as the lifting tape is raised or lowered, the lifting tape slides over the guide-rollers C, D. To compensate for uneven loading of the gripper plate, one or both of the guide-rollers C, D may be activated to assist hoist drums A or B respectively to keep the gripper plate level as determined from a sensor mounted on the gripper plate. For example, if heavy objects are placed in one side of a container then one of the assistant guide-rollers may be powered to compensate for the additional load on that side to keep the container relatively level.

Guide-roller E is a tensioning wheel or roller, positioned between rollers C and D and is movable to tighten or slacken the lifting tape. For example, guide-roller E may be mounted on a spring.

Typically, the lifting assembly comprises two sling arrangements A, B, C, D, E and A', B', C', D', E', as illustrated in FIG. 8. Hoist drum A and hoist drum A' are driven by the same motor. Similarly, hoist drum B and hoist drum B' are driven by the same motor, and similarly rollers C and C' and rollers D and D' may be rotationally linked.

It will be appreciated that the pairs of drums and rollers A-A', B-B', C-C', and D-D' may be mounted on the same shaft, or the drums and roller pairs may be mounted on separate shafts.

It will be appreciated that the lifting assembly may comprise one or more additional sling assemblies, thereby proportionally reducing the load on each sling assembly.

In normal use each of the sling assemblies (lifting tape and roller set) are operated together to lift and lower the gripper plate. In normal use, the lifting tape is wrapped around both hoist drum A and hoist drum B by a substantially equal amount, and the hoist drums operate at a similar speed. As a result, the gripper plate is lifted at the speed of the hoist drums A, B.

If only one of the hoist drums A or B is used to coil the lifting tape to lift the gripper plate then the gripper plate is lifted at half the speed at which the hoist drum A or B is rotated at. Thus, the gripper plate would be lifted at half the speed compared with the lifting rate under normal use. In this case, the maximum amount of load that it is possible to lift will also be reduced because only one motor is producing torque.

With this arrangement, if for any reason it is not possible to operate one of the hoist drums A, B, then, as a result of the sling arrangement, it is still possible to lift or lower the gripper plate using the other of the hoist drums A, B to pull or feed the lifting tape through the guide-rollers C, D, E as the lifting tape is wrapped around or unwound from the operational hoist drum A, B respectively. Accordingly, a fault in a hoist drum A, B assembly does not result in total failure of the lifting assembly.

The illustrated lifting arrangement has various advantages, including that: cost and space within the body of the load handling device may be saved relative to arrangements incorporating more motors; the rates of winding and unwinding of the spools or hoist drums A-B, A'-B' do not need synchronising allowing them to be wound and unwound at the same rate without additional gearing, control or other intervention; only a single control unit is required to control the raising and lowering of the hoist drums.

As will be discussed in more detail below, the gripper plate has one or more griper assemblies mounted thereon for latching to a storage container.

FIGS. 9 and 10 show representations of lifting assemblies 180, 190 of a load handling device 100 for raising and lowering a container 10. The lifting assembly 180, 190 comprises a gear 182, 192 and motor 181, 191.

Extending through the gear 182, 192 a common axle 183, 193 extends to first and second hoist drums 184, 194, around which lifting tape 185 is wound. A first end of the lifting tape 185 is attached to the hoist drums 184, 194, and the second end is attached to the same hoist drums 184, 194 in a sling arrangement supporting a gripper plate as described above in connection with FIGS. 5-8. In an alternative arrangement a first end of the lifting tape 185 is attached to the hoist drums 184, 194, and the second end of the lifting tape is attached to a gripper plate. Slave wheels 186 are used to guide the lifting tape 185 to the gripper plate attached to the ends of the lifting tape 185 and/or to adjust the tension in the lifting tape 185. The gripper plate is used to latch to a load, which may then be lifted and lowered by the lifting assembly 180, 190.

In the case of the assembly 180 shown in FIG. 9, first and second lifting tapes 185 are wound alternately around the drums 184. Thus, when the first and second drums 184 are rotated by the motor 181 to lower the gripper plate, both tapes 185 unwind at the same time and at the same speed. In reverse, the lifting tapes 185 wrap around the hoist drums 184 at the same time and speed, thereby lifting a weight or payload supported by the gripper plate.

In the case of the assembly 190 shown in FIG. 10, first and second ends of lifting tapes 185 are wound around twin drums 194 at each end of the axle 193.

For both assemblies 180, 190, at each end of the axle 183, 193, the tapes 185 unwind from the top and bottom of the drum 184, 194 respectively to balance the forces applied to the assembly. For both assemblies 180, 190 the drums 184, 194 are in the z,x-plane. Alternatively, the drums 184, 194 may be arranged in the z,y-plane.

It will be appreciated that the diameter of the drum 184 is necessarily larger than the respective drums 194 for a given length of lifting tape 185. Correspondingly, the gear 182 is larger than the gear 192, and the required torque produced by motor 181 is larger than the required torque produced by motor 191.

The lifting assembly 180 has the advantage that fewer parts are required. The lifting assembly 190 has the advantage that the drums 194, gear 192 and motor 191 are smaller. In both cases, the space required within the body of the load handling device 100 by the lifting assembly may be minimised.

The illustrated lifting arrangements have various advantages, including that: cost and space within the body of the load handling device may be saved relative to arrangements incorporating more motors; the rates of winding and unwinding of the spools or hoist drums 184, 194 do not need synchronising, as they are all driven by the same motor 181, 191, allowing them to be wound and unwound at the same rate without additional gearing, control or other intervention; only a single control unit is required to control the raising and lowering of the hoist drums 184, 194.

It will be appreciated that where four tapes are used a gripper plate may be attached to the distal ends of the lifting tapes 185. It will be appreciated with a sling arrangement as discussed above, a gripper plate is supported by the sling. The gripper plate will have one or more gripper assemblies (discussed in more detail below in connection with FIG. 15) mounted thereon for latching to a storage container 10.

FIGS. 11 and 12 illustrate alternative drum arrangements for lifting assemblies 220, 230. For both assemblies 220, 230 the drum 221, 231 is in x,y-plane. This arrangement has the advantage that the drum can be much larger without occupying space within the body of a load handling device.

Instead, the drum 221, 231 is substantially in plane with the upper face or surface of the load handling device. The diameter of the drum 221, 231 may be substantially up to the length of the shorter x or y side of the load handling device.

Advantageously the drum 221, 231 is wound with a much smaller motor 222, 232. The drive shaft of the motor 222 has a worm gear 223 which directly drives the drum 221. This allows the motor 222 to be arranged in the same plane as the drum 221, and enables a large step down ratio without the need for additional gear wheels. The drive shaft of the motor 232 is coupled to the drum 231 with a simple direct drive pulley arrangement 233. The motor 232 is arranged vertically or z direction, perpendicular to the plane of the drum 231.

In the arrangements of FIGS. 11 and 12, four lifting tapes 185 are spooled around the same drum 221, 231. The four lifting tapes 185 are directed to the four corners of a gripper plate 130. As a result, each corner of the gripper plate 130 is lifted and lowered in unison when the drum 221, 231 is operated and the tapes are spooled or unspooled.

Figure 14:
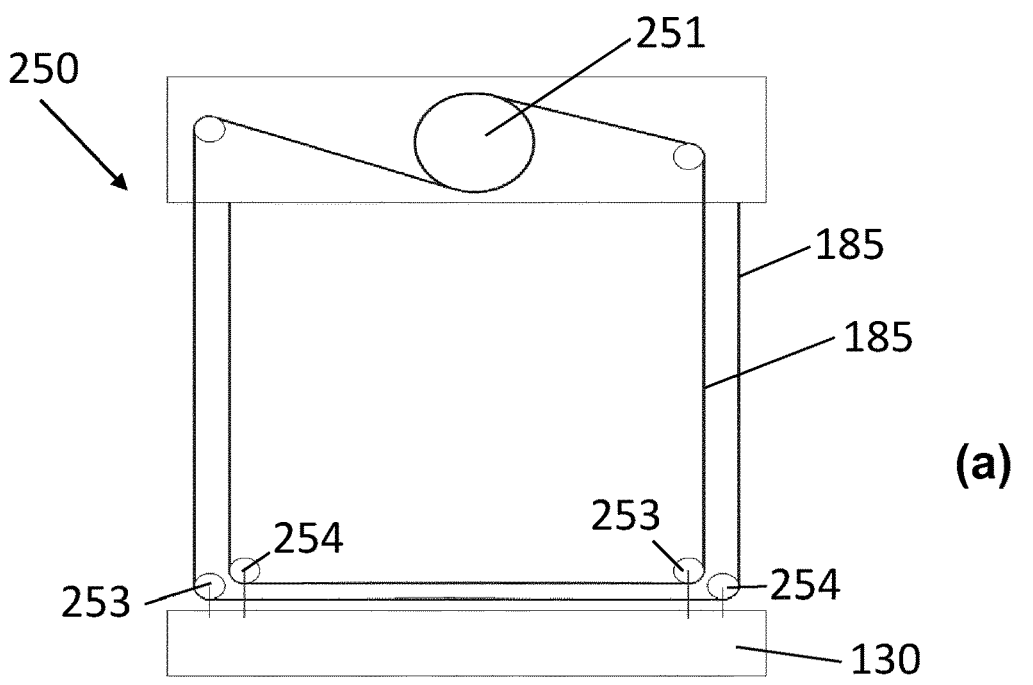
Figure 14:
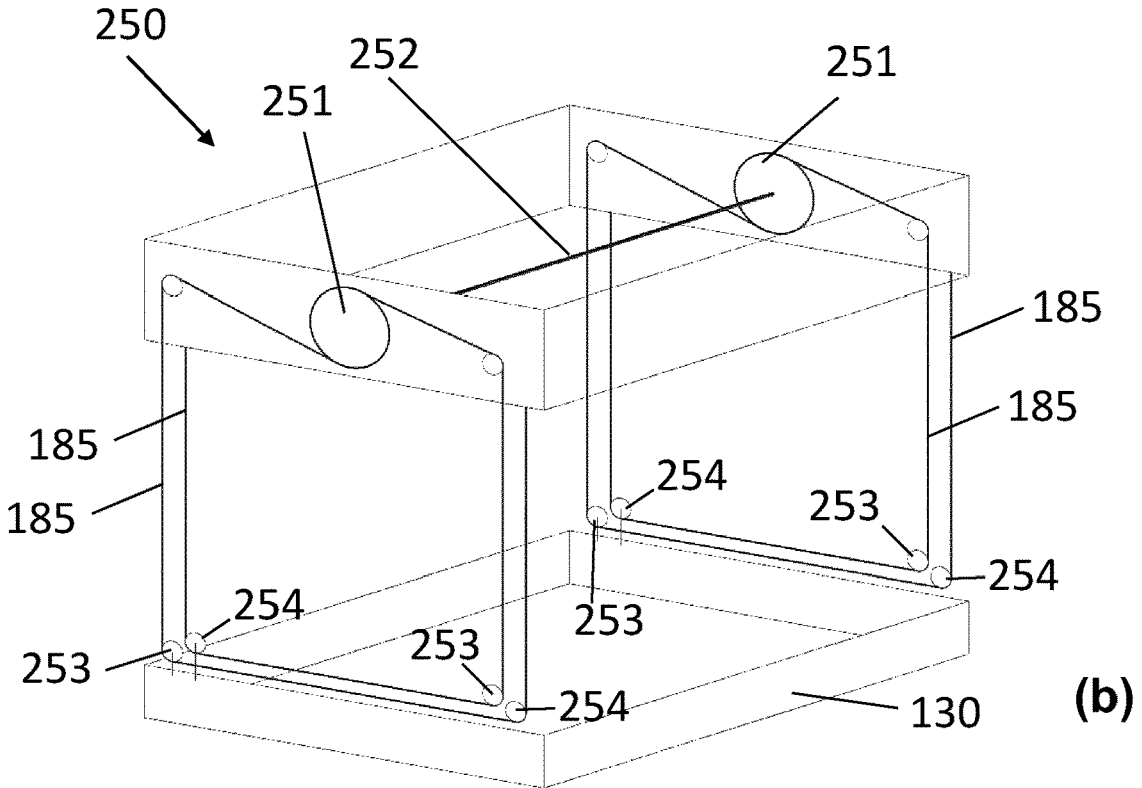

FIGS. 13 and 14 illustrate two more alternative lifting assemblies 240, 250. In these examples, "lifting tapes 185" are instead referred to as "ropes 185" or "wires 185". It will be appreciated that the terms are intended to be used interchangeably, and whether tapes, ropes or wires are used will depend on the intended purpose and tensile strength required.

In a rope and pulley system, sometimes known as "block and tackle", a single continuous rope transmits a tension force around one or more pulleys to lift a load. If there are p of these parts of the rope supporting the load W, then a force balance on the moving block shows that the tension in each of the parts of the rope must be W/p. This means the input force on the rope is T=W/p. Thus, the block and tackle reduces the required input force for lifting the load by the factor p. It will be appreciated that the mechanical gain requires a proportional increase in the required distance of travel of the rope.

In FIG. 13, the lifting assembly 240 comprises four pulley systems. The four pulley systems are driven by a motor 241 which drives a spool wheel 242 arranged at the upper face of the lifting assembly 240. Substantially adjacent to the spool wheel 242 is arranged an upper pulley 243. A gripper plate 130 is at the lower end of the lifting assembly 240, and mounted thereon at each corner there is a double pulley 244. It will appreciated that the upper face is a fixed block of the pulley system and the lower face a movable block of the pulley system. The combination of the fixed block and the movable block form a "block and tackle". The upper and lower blocks or the pulley system may be mounted on the same axle.

A first end of a lifting rope 185 is fixed to the spool wheel 242, and the lifting rope 185 may be spooled around the spool wheel 242. The rope 185 extends from the spool wheel 242 around the double pulley 244, over the upper pulley 243, around the double pulley 244 for a second time and back up to the upper pulley 243 where the second end of the lifting rope 185 is fixed.

The operation of the four motors 241 is coordinated so that the gripper plate 130 is kept level. FIG. 14a illustrates a single z,x- or z,y-plane of a lifting assembly 250, and FIG. 14b is a perspective view illustrating two z,x- or z,y-planes of the lifting assembly 250. The arrangement of the lifting mechanism is similar to the arrangement of the lifting assembly described above in connection with FIGS. 9 and 10, where hoist drums 251 share a common axle 252. A first pair of tapes 185 are spooled on a first drum 251, and a second pair of tapes 185 are spooled on a second hoist drum. The two pairs of tapes 185 are directed to support each corner of a gripper plate 130. Further, the tapes 185 of lifting assembly 250 comprise a pulley system sling arrangement.

Considering the pair of tapes 185 of a single hoist drum 251, a first end of the tapes 185 is fixed to the respective drum 251. The tapes 185 extend to opposed corners of the upper portion of the lifting assembly 250 where they are directed by a guide towards the gripper plate 130. A first pulley 253 mounted on the gripper plate directs the tapes 185 along the gripper plate 130 to a second pulley 254 mounted on the gripper plate 130. From the second pulley 254 the tapes 185 return to the upper portion of the lifting assembly 250 where the second end of the tapes 185 is fixed. Thus, the pair of tapes 185 form a nested pair of sling arrangements.

It will be appreciated that the lifting assembly 250 has the advantages of the shared motor arrangement of FIGS. 9 and 10, the advantages of the sling arrangement of FIGS. 5-8, and the advantages of the pulley arrangement of FIG. 13.

The components of the lifting assembly may be mounted directly on or indirectly on a frame that is releasably mountable on a load handling device. Thus, the lifting assembly is used to lift containers into the cavity of the load handling device. It will be appreciated that the lifting assembly used in reverse is used to lower containers from the load handling device to a position in a stack below the grid.

Configuring the lifting assembly for releasable mountability on the load handling device may advantageously mean that lifting assembly can be easily removed and replaced with another lifting assembly (e.g. if the first assembly needs to be serviced or repaired), allowing the corresponding load handling device to return to service relatively quickly.

A communications cable reel may also mounted on the lifting assembly for transmitting control instructions from a control unit to the gripper assemblies. The communications cable may transmit sensor data to the control unit, for example, to ensure that the gripper plate is latched to the container. The communications cable is also raised and lowered with the gripper plate. Alternatively, other forms of communication may be employed between the lifting assembly and a control unit.

Before the lifting assembly raises or lowers the gripper plate and any engaged container, the load handling device may be put into a parked configuration. This may provide additional stability as the lifting assembly is raised and lowered.

The gripper plate 130 comprises at least one gripper assembly arranged to be aligned with recesses or holes in the upper surface of a storage container 10 such that the gripper assembly may latch to the storage container 10. More usually the gripper plate 130 will comprise two or more gripper assemblies. Typically the gripper plate 130 will comprise four gripper assemblies arranged in locations to correspond to cooperating recesses of a storage container 10.

Figure 15:
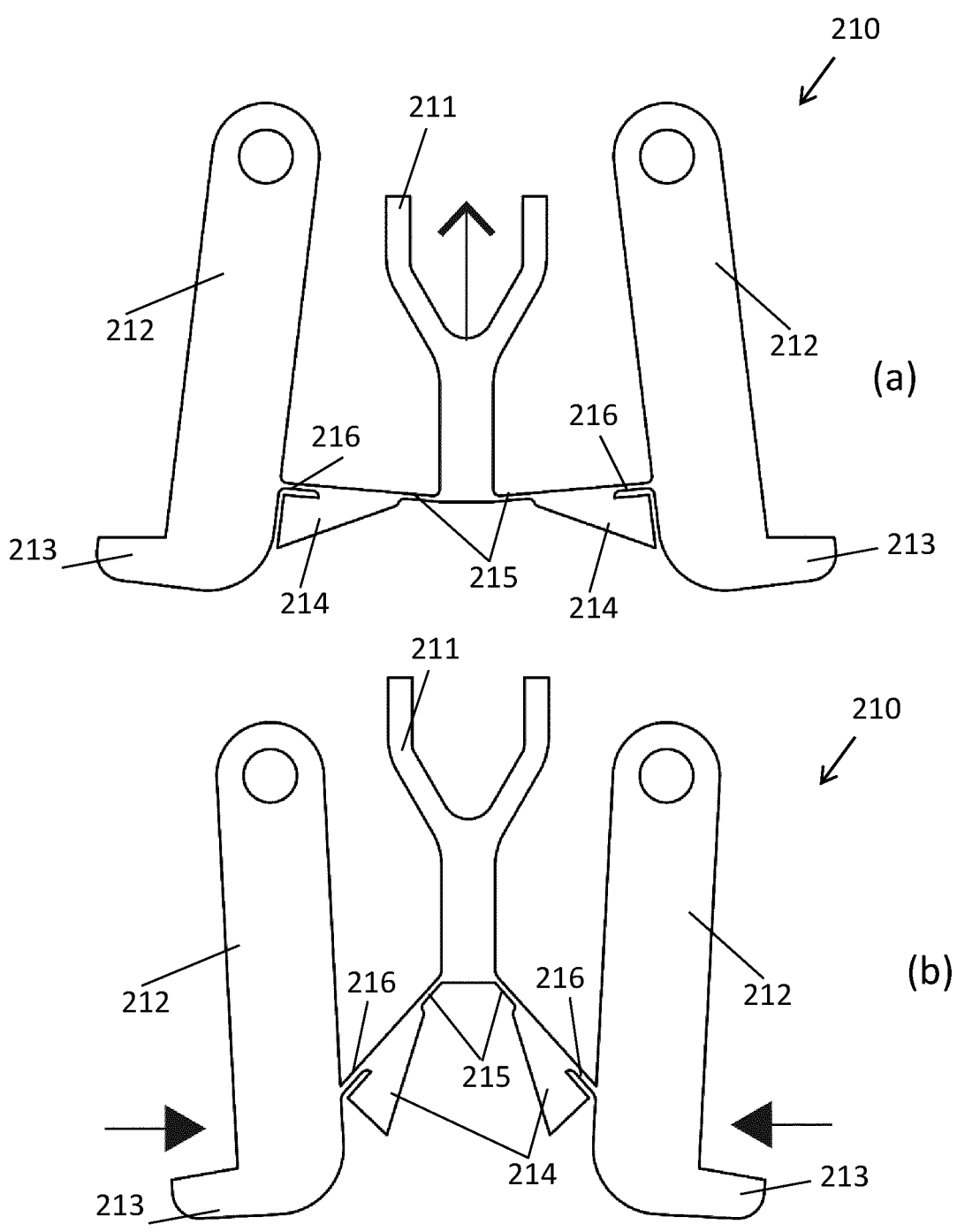

FIG. 15 illustrates a self-locking gripper assembly for use on the load handling devices described here. The gripper assembly comprises a flexure mechanism 210 movable between bi-stable locked and release configurations. The flexure mechanism 210 comprises an actuator 211, two gripper-arms 212 having hook-ends 213 and two flexural hinge arrangements connecting the gripper-arms 212 to the actuator 211. The flexural hinge arrangements each comprise a triangular fulcrum or keystone-form 214, a first deformable section 215 between the actuator and the keystone-form and a second deformable section 216 between the keystone-form and the gripper-arms 212. The deformable sections 215, 216 are relatively thin sections compared with the other sections of the flexure mechanism 210. In this way, the deformable sections preferentially bend or flex when an appropriate force is applied to the flexure mechanism 210.

Referring to FIG. 15, in the locked configuration (FIG. 15a) the keystone-forms 214 engages or abuts the respective gripper-arms 212. In the locked configuration the flexure mechanism 210 is open or wide and the gripper-arms spread. The flexure mechanism 210 may be moved into the locked configuration by applying a downward force on the actuator 211. When in this configuration, the actuator 211 is in a downward position relative to the gripper-arms 212.

The flexure mechanism 210 may be moved from the locked configuration into the unlocked or release configuration by applying an upward force or pulling force on the actuator 211 as indicated in FIG. 15a. Referring to FIG. 15b, when such a force is applied, the first and second hinges 215, 216 bend or flex, releasing the keystone-form 214 from engagement with the gripper-arms 212. The first hinges 215 bend so that the keystone-forms 214 pivot downward relative to the actuator 211. The second hinges 216 bend so that the keystone-forms 214 pivot upwards relative to the gripper-arms 212. Thus, the actuator 211 moves to an upward position relative to the gripper-arms 212 which draws the hooked end 213 of the gripper-arms together, as indicated by the solid arrows in FIG. 15*b*, into a narrow or closed arrangement.

In an alternative arrangement, a flexure mechanism 210 may be moved into the unlocked or release configuration by applying a downward force or pushing force on the actuator 211.

As mentioned above, the gripper assembly is for latching to a storage container 10 so that the storage container 10 may be lifted. The gripper assembly is arranged to be compatible with the storage container 10. Typically storage containers 10 have recesses around the edge of the container on the upper faces.

In use, in the narrow or flexed configuration shown in FIG. 15*b*, the flexure mechanism 210 is inserted into the recess. Once inserted, a downward force may be applied to the actuator 211. This puts the flexure mechanism 210 into the locked configuration, and the flexure mechanism 210 is wide as shown in FIG. 15*a*. It is then not possible to remove the flexure mechanism 210 from the recess of the container. The hooked end 213 of the gripper-arms engages with the underside of the upper surface of the container 10. Therefore, a lifting force may be applied to the gripper-arms 212 to lift the container 10.

In use, as part of a load handling device 100, gripper assemblies 210 are mounted on a gripper plate 130 and the actuators 211 may be operated by a solenoid motor, or electromagnet for example.

In use with a load handling device, grippers 210 are used at each corner of a container 10, to latch the lifting assembly 180, 190, 200, 220, 230, 240, 250 to the container 10. The lifting assembly 180, 190, 200, 220, 230, 240, 250 is then operated to lift the container 10 into the cavity of a load handling device so that the container 10 may be transported by the load handling device. FIG. 16*a* illustrates a load handling device 100 without a container, and FIG. 16*b* illustrates a load handling device 100 having a container 10 lifted into the cavity.

It will be appreciated that the gripper assembly 210 may have more than two gripper-arms and a corresponding number of flexural hinge arrangements arranged around the actuator. In some arrangements, additional gripper-arms may provide more secure attachment to the storage container.

The components of the lifting assembly may be mounted directly on or indirectly on a frame that is releasably mountable on a load handling device. Thus, the lifting assembly is used to lift containers into the cavity of the load handling device. It will be appreciated that the lifting assembly used in reverse is used to lower containers from the load handling device to a position in a stack below the grid.

Configuring the lifting assembly for releasable mountability on the load handling device may advantageously mean that lifting assembly can be easily removed and replaced with another lifting assembly (e.g. if the first assembly needs to be serviced or repaired), allowing the corresponding load handling device to return to service relatively quickly.

A communications cable reel may also be mounted on the lifting assembly. The communication cable transmits control instructions from a control unit to the assistant guide-rollers, and the gripper assemblies. The communications cable may transmit sensor data to the control unit, for example, to ensure that the gripper plate and a lifted container are kept level. The communications cable is also raised and lowered with the gripper plate. In an alternative arrangement, communication between the upper portion of the lifting assembly and the gripper plate may be by optical communications.

FIGS. 17-21 illustrate means for manoeuvring the load handling device on a grid based storage and retrieval system. FIGS. 17 and 18 illustrate a four wheel drive arrangement, and FIGS. 19 and 20 illustrate an eight wheel drive arrangement. As noted above, the load handling device has a first set of wheels 116 and a second set of wheels 118 for moving the load handling device in a first direction and a second direction respectively. The first set of wheels 116 comprises four wheels arranged in pairs on opposed sides, and the second set of wheels 118 comprises four wheels arranged in pairs on opposite sides, perpendicular to the first set of wheels 116.

As illustrated in FIG. 18 the pair of wheels on each side face of the load handling device comprise an idler wheel 270 and a driven wheel 272, 274. For each driven wheel 272, 274 a respective drive motor 273 is positioned such that its drive shaft is parallel and non-coaxially arranged with respect to the rotational axis of its driven wheel 272, 274. In this embodiment, the drive motors 273 are arranged on the perpendicular face sharing an edge with the face of the driven wheel 272, 274. Thus, each side face of the load handling device comprises one drive motor 273. A gear arrangement, such as a pulley gear 275, transfers the torque from the motors 273 around the corner through 90° to the wheel 272, 274. This arrangement allows the motor to be arranged with the axis of the drive shaft extending along the perpendicular face of the load handling device. The motor 273 may conveniently be arranged within the side of the load handling device, such that the motor 273 is substantially encompassed by the side, or the motor 273 may be mounted on the outside of the load handling device. However, regardless of its location on the load handling device, as a consequence of the parallel and non-coaxial arrangement between its drive shaft and the rotational axis of its respective driven wheel 272, 274, the drive shaft of the motor 273 may be much longer than if the wheels where directly driven, for example, by a hub motor. The motor 273 may be a lightweight high RPM motor. The pulley gear arrangement 275 may comprise a planetary gear system to reduce the RPM of the wheels and provide the correct torque. As the motor 273 is positioned proximal to the wheel, the length of the drive belt or pulley may be minimal.

The idler wheels 270 are passive, and simply provide support to the load handling device. In this way, the number of motors 273 required for separately driven wheels 272, 274 is reduced. Typically, in a four wheel driven arrangement, the wheels in diagonally opposite corners are driven for the x-direction and the wheels 272, 274 in diagonally opposite corners are driven for y-directions, as shown in FIG. 18.

As the pair of wheels on each side face of the load handling device comprise an idler wheel 270 and a driven wheel 272, 274, it will be appreciated that both first set of wheels 116 and the second set of wheels 118 comprise idler wheels 270 and drive wheels 272, 274.

The driven wheels 272, 274 can be grouped according to power source provided to the motors 273. A first sub-set of driven wheels 272 may be powered by a first power source and a second sub-set of driven wheels 274 may be powered by a second power source. One driven wheel 272 of the first set of wheels 116 may be powered by the first power source, and one driven wheel 272 of the second set of wheels 118 may be powered by the first power source. Similarly, one driven wheel 274 of the first set of wheels 116 may be powered by the second power source, and one driven wheel 274 of the second set of wheels 118 may be powered by the second power source. In this way, in the event that the first power source or the second power source has a fault or fails, at least one driven wheel 272, 274 in the x-direction and at least one driven wheel in the y-direction will continue to be operational, allowing the load handling device to be maneuvered at reduced speed to a maintenance or recovery area on the grid, or to the edge of the grid.

As illustrated in FIG. 19 the pair of wheels on each side face of the load handling device comprises a driven wheel 272 of a first sub-set and a driven wheel 274 of a second sub-set. For each driven wheel 272, 274 a drive motor 273 is arranged on the perpendicular face sharing an edge with the face of the driven wheel 272, 274. Thus, each side face of the load handling device comprises two drive motors 273 positioned such that their drive shafts are parallel and non-coaxially arranged with respect to the rotational axis of its respective driven wheel 272, 274. In alternative embodiments, the drive motors 273 may be positioned inside the load handling device or within the side of the load handling device, such that the drive motors 273 are substantially encompassed by the side. Similarly to the arrangement described in connection with FIG. 17, a gear arrangement, such as a pulley gear 275, transfers the torque from the motors 273 around the corner through 90° to the wheel 272, 274. It will be appreciated that, while the drive shaft of the motor 273 may be much longer than if the wheels were directly driven, compared with the arrangement illustrated in FIG. 17, because there are two drive motors 273 on each side face, the amount of space for one of the drive motors 273 is more limited. Further, it should be noted that while the illustration of FIG. 19 shows more details of the motor 273 and pulley gear arrangement 275 compared with the motor and pulley gear arrangement 275 of FIG. 17, the arrangements are intended to be similar.

As with the four driven wheel arrangement, and as shown in FIG. 20, the driven wheels 272, 274 can be grouped according to power source provided to the motors 273. A first sub-set of driven wheels 272 may be powered by a first power source and a second sub-set of driven wheels 274 may be powered by a second power source. Two driven wheels 272 of the first set of wheels 116 may be powered by the first power source, and two driven wheels 272 of the second set of wheels 118 may be powered by the first power source. Similarly, two driven wheels 274 of the first set of wheels 116 may be powered by the second power source, and two driven wheels 274 of the second set of wheels 118 may be powered by the second power source. In this way, in the event that the first power source or the second power source has a fault or fails, at least two driven wheels 272, 274 in the x-direction and at least one driven wheel in the y-direction will continue to be operational, allowing the load handling device to be maneuvered at reduced speed to a maintenance or recovery area on the grid, or to the edge of the grid. It will be appreciated that in an eight driven wheel arrangement, first and second sub-set driven wheels 272, 274 may be further divided according to the arrangements for the four driven wheels—providing two cooperating four drive wheel arrangements—to provide further redundancy and opportunity for reduced capability self-recovery of a load handling device experiencing drive faults or failures.

It will be appreciated that in the foregoing description it is intended that the first power source and the second power source, and any sub-divisions thereof are intended to be independent.

Further, it will appreciated that although the drive arrangement has been described with a particular motor arrangement, the pattern of driven wheels 272, 274 is independent of the particular motor arrangement, and may be achieved with hub motors for example.

FIG. 21 illustrates the drive arrangement and a direction-change assembly of a load handling device in more detail. It will be appreciated that the illustrated corner edge is similar to one of the corners of FIG. 19, and shows one wheel of the first set of wheels 116 and one wheel of the second set of wheels where both wheels are driven by respective motors 273 and pulley gear arrangements 275 as described above.

It will be appreciated, that the load handling device is able to move on the grid in the x-direction when the first set of wheels 116 are engaged with the tracks, or the load handling device is able to move on the grid in the y-direction when the second set of wheels 118 are engaged with the tracks. When both the first set of wheels 116 and the second set of wheels 118 are engaged with the tracks then the load handling device is unable to move in any direction. Accordingly, as well as being able to selectively drive the wheels in forward and reverse direction, it is necessary to have the ability to selectively engage the first set of wheels 116 and the second set of wheels 118 with the track.

In the arrangement illustrated in FIGS. 19 and 21, the wheels 116, 118 are individually lift-able in the vertical or z-direction by a linear actuator 280 arranged on the body of the load handling device above the wheel axle. In this arrangement, the wheel axle may be movable in a vertical direction. It will be appreciated, that the lifting actuators 280 for the first wheel set 116, and the lifting actuators 280 for the second wheel set 118 are coordinated by a control utility to ensure that the load handling device is properly supported.

It will be appreciated, that having individual wheel actuators 280 means that a single wheel of the first set of wheels 116, or the second set of wheels 118 may be lifted where there is a fault in the single wheel/drive arrangement and the wheel is unable to rotate (when driven or un-driven) so that the load handling device may return to a maintenance or recovery area on the grid, or to the edge of the grid.

In a variation, the wheel 116, 118 may be lifted by locking the wheel 116, 118 rotation while allowing the wheel axis to move upwards in the z-direction. The wheel 116, 118 can then be powered by the drive motor 273.

It will be understood that as a result of lifting or raising the wheels 272, 274 the drive belt may become slack. Accordingly, additional slave pulleys 276 may be provided, to maintain tension in the drive belt when the wheel 272, 274 is lifted. In a variation, the motor 273 maybe arranged to be lifted together with the wheels 272, 274 thereby avoiding a slackening of the drive belt.

As illustrated in FIGS. 17, 19 and 21 the drive assembly and the direction-change assembly are positioned on the outside of the load handling device body, and this has the advantage of maximising the volume within the load handling device for receiving a container in a cavity receiving space. It will be appreciated that in an alternative arrangement, the drive assembly and the direction-change assembly could be positioned on the inside face of the load handling device body.

In order to operate autonomously, the load handling device has its own power supply means. The power supply means may be in the form of rechargeable or interchangeable batteries.

The batteries may be located within the skeleton or body of the load handling device. For example, where the skeleton comprises a hollow rod structure, batteries may be inserted into the rods.

Various control and sensor arrangements are described in WO2019170805 (Ocado), which is incorporated herein by reference.

The load handling device is controlled by an on-board control facility.

The control facility may comprise communication means such as a transceiver unit, or transmitter and receiver units, for sending and receiving instructions from a centralised control facility of the system. The load handling device is able to act substantially autonomously based on instructions or tasks from the centralised control facility.

The on-board control facility is able to control and operate the direction-change mechanism, the drive assembly and the lifting assembly according to instructions received from the centralised control facility. The on-board control facility further comprises input from various sensors and cameras to provide feedback to the control facilities regarding the condition of the load handling device and the environment around the load handling device.

Based on the condition and environment around the load handling device, the on-board control facility operates the direction-change, drive and lifting assemblies to carry out tasks.

Accurate knowledge of the condition of the load handling devices is required to determine the speed at which the load handling device may operate, and when tasks are completed and when the load handling device is available to complete subsequent tasks.

Accurate positioning of each load handling device is required to allow load handling devices to be driven at faster speeds and/or accelerations with minimal positional errors allowing for a reduction in the spacing between load handling devices on the grid system to increase the efficiency of the system.

More than one type of sensor may be used to determine the condition and environment of the load handling device, in order to verify that the received information is correct. More than one sensor of the same type may be mounted on the load handling device at different locations.

In this way, each of the sensors detects different parts of the environment in which the load handling device is operating. Multiple sensors are advantageous because they provide redundancy on the device in that if one sensor fails to capture appropriate information from the environment then one of the other sensors may be more successful.

Moreover, in positions where one sensor is unable to capture the environment (such as over rail intersections) then another sensor may be able to capture the environment more successfully. In addition, with multiple sensors other measurements may be taken such as determining a rotational orientation of the transporting device by comparing positional measurements from one sensor to the same positional measurement on a sensor mounted on an opposing face of the transporting device to determine an angle between the sensors.

It will be appreciated that for operating in a larger system, even though some faults may be tolerated and that it is possible to operate larger systems efficiently with some components of the system operating beyond the point of failure, redundancy on individual load handling devices is desirable for other reasons.

A load handling device may comprise many different types of sensors, for example: cameras, ultrasonic detectors, x-ray cameras, trundle, or dead reckoning wheel arrangement, gyroscopic, barcode or QR scanner for reading markings provided on the grid; RFID reader for identifying items stored in the system.

Sensors may be provided for: assessing the communications functions within the load handling device, measuring traction between the wheels and the grid tracks, measuring the distance travelled, measuring the speed of travel, determining the grid position of the load handling device on the grid, accurate positioning of the load handling device in a single grid space.

It will be appreciated that the load handling device may comprise all, one or any combination of the features described above and that it is not essential to the invention for the service device to include all the sensors and features described.

It is envisaged that any one or more of the variations described in the foregoing paragraphs may be implemented in the same embodiment of a load-handling device.

The invention described herein has been in connection with load handling devices for a grocery retrieval system by way of example. It will be appreciated that the storage system and devices described herein are not limited to the type of article stored and managed therein.

Further, it will be appreciated that some embodiments of the invention may be used in connection with manual handling equipment other than load handling devices.

Many variations and modifications not explicitly described above are also possible without departing from the scope of the invention as defined in the appended claims.

The invention claimed is:

1. A load handling device for lifting and moving storage containers stacked in a grid framework grid with a structure comprising:

a first set of parallel rails or tracks and a second set of parallel rails or tracks extending substantially perpendicularly to the first set of parallel rails or tracks in a substantially horizontal plane to form a grid with a grid pattern having a plurality of grid spaces, wherein the grid is supported by a set of uprights to form a plurality of vertical storage locations beneath the grid for containers to be stacked between and be guided by the uprights in a vertical direction through the plurality of grid spaces, the load handling device comprising:

a body mounted on a first set of wheels being configured and arranged to engage with the first set of parallel rails or tracks and a second set of wheels being configured and arranged to engage with the second set of parallel rails or tracks; and a drive assembly for driving the load handling device in a first direction along the first set of parallel rails or tracks or driving the load handing device in a second direction along the second set of parallel rails or tracks, wherein the drive assembly comprises:

a first set of at least two motors for driving respective wheels of the first set of wheels; and a second set of at least two motors for driving respective wheels of the second set of wheels, wherein each motor of the first and second sets of at least two motors is positioned such that each drive shaft is parallel and non-coaxially arranged with respect to an axis of rotation of a corresponding one of the respective wheels of the first and second sets of wheels; and a number of gear arrangements corresponding to a number of motors of the first and second sets of at least two motors for transferring drive from each motor of the first and second sets of at least two motors to a corresponding one of the respective wheels of the first and second sets of wheels, wherein each motor of the first and second sets of at least two motors is arranged on a face of the body perpendicular to a corresponding one of the respective wheels of the first and second sets of wheels.

2. A load handing device according to claim 1, wherein the first set of wheels includes two wheels on a first face of the load handling device, and two wheels on a first opposed face of the load handing device;

wherein the second set of wheels includes two wheels on a face of the load handing device perpendicular to the first face of the load handling device, and two wheels on a second opposed face of the load handing device; and wherein at least one wheel of the two wheels on each face of the first face, the first opposed face, the face perpendicular to the first face, and the second opposed face of the load handling device is configured to be driven by a respective motor of the first and second sets of the at least two motors.

3. A load handing device according to claim 1, wherein each wheel of the first set of wheels and the second set of wheels is configured to be driven by a respective motor of the first and second sets of at least two motors.

4. A load handling device according to claim 1, wherein at least one of the first set of wheels and at least one of the second set of wheels are driven by a motor(s) of the first and second sets of at least two motors powered by a first power source, and at least one of the first set of wheels and at least one of the second set of wheels are driven by a motor(s) of the first and second sets of at least two motors powered by a second power source, and the first power source and the second power source are independent or separate.

5. A load handling device according to claim 4, wherein two of the first set of wheels and two of the second set of wheels are driven by the motor(s) of the first and second sets of at least two motors powered by the first power source, and two of the first set of wheels and at least one of the second set of wheels are driven by the motor(s) of the second sets of at least two motors powered by the second power source.

6. A load handling device according to claim 4, wherein the first power source and/or the second power source is sub-divided into at least two independent parts.

7. A load handling device according to claim 1, wherein the load handling device comprises:

means for selectively driving the first set of wheels or the second set of wheels.

8. A load handling device according to claim 1, wherein the load handling device comprises:

a direction change assembly for selectively engaging the first set of wheels and or the second set of wheels respectively with the first set of parallel rails or tracks and the second set of parallel rails or tracks.

9. A load handling device according to claim 8, wherein the direction change assembly comprises:

a first set of direction change pulleys for the first set of wheels; and a second set of direction change pulleys for the second set of wheels, wherein the direction change pulleys are configured to operate to selectively lift the first set of wheels or the second set of wheels to disengage the first set of wheels or the second set of wheels respectively from the first set of parallel rails or tracks or the second set of parallel rails or tracks.

10. A load handling device according to claim 9, wherein the first set of direction change pulleys and/or the second set of direction change pulleys are operated in unison for the first set of wheels and/or the second set of wheels, by a direction change motor for each wheel of the first set of wheels and/or the second set of wheels.

11. A load handling device according to claim 8, wherein the first set of wheels and the second set of wheels are configured to move in synchronisation relative to the body to selectively engage and disengage the first set of wheels and the second set of wheels respectively with the first set of parallel rails or tracks and the second set of parallel rails or tracks.

12. A load handling device according to claim 1, comprising:

a lifting assembly for lifting and or lowering a storage container from and or to a storage location beneath the grid.

13. A load handling device according to claim 1, comprising:

sensing means for:

determining load handling device location on the grid;

determining a fault or failure in the drive assembly;

determining engagement of the first set of wheels or the second set of wheels respectively with the first set of parallel rails or tracks or the second set of parallel rails or tracks;

determining a fault or failure in the direction change assembly; and/or determining engagement and/or disengagement of the lifting assembly with a container.

14. A grid-based storage and retrieval system comprising:

at least one load handling device according to the load handling device of claim 1 configured and arranged for operating on the grid framework grid;

the grid framework grid with the structure;

and a centralised control utility for controlling the at least one load handling device(s).

15. A system according to claim 14, wherein the at least one load handing device comprises:

a communication means; and the centralised control utility of the storage system comprises:

communication means for communicating with a communication means on the at least one load handling device.

16. A system according to claim 14, wherein the centralised control utility is configured to remotely monitor a condition of the at least one load handling device.

17. A system according to claim 14, wherein if a malfunction and or failure of the load handling device is detected, the load handling device is instructed by the centralised control utility to move to a maintenance area or edge of the gird using non-malfunctioning and non-failed means.

18. A system according to claim 14, wherein the centralised control utility is configured to communicate with the at least one load handling device operating on the grid to instruct the load handling device to move to a specific location on the grid.

19. A system according to claim 18, wherein the centralised control utility is configured for instructing the load handling device to lift a container from a stack and move the container to another location on the grid, and/or for instructing the load handling device to lower a container into a stack position beneath the grid.

20. A method of maneuvering a load handing device operating on a grid framework structure, the grid framework structure having a first set of parallel rails or tracks and a second set of parallel rails or tracks extending substantially perpendicularly to the first set of parallel rails or tracks in a substantially horizontal plane to form a grid with a grid pattern having a plurality of grid spaces, wherein the grid is supported by a set of uprights to form a plurality of vertical storage locations beneath the grid for containers to be stacked between and be guided by the uprights in a vertical direction through the plurality of grid spaces, and the load handling device having:

a body mounted on a first set of wheels being configured and arranged to engage with the first set of parallel rails or tracks and a second set of wheels being arranged to engage with the second set of parallel rails or tracks; and a drive assembly for driving the load handling device in a first direction along the first set of parallel rails or tracks or driving the load handing device in a second direction along the second set of parallel rails or tracks, wherein the drive assembly comprises:

a first set of at least two motors for driving respective wheels of the first set of wheels; and a second set of at least two motors for driving respective wheels of the second set of wheels, wherein each motor of the first and second sets of at least two motors is positioned such that each drive shaft is parallel and non-coaxially arranged with respect to an axis of rotation of a corresponding one of the respective wheels of the first and second sets of wheels; and a number of gear arrangements corresponding to a number of motors of the first and second sets of at least two motors for transferring drive from each motor of the first and second sets of at least two motors to a corresponding one of the respective wheels of the first and second sets of wheels, wherein each motor of the first and second sets of at least two motors is arranged on a face of the body perpendicular to a corresponding one of the respective wheels of the first and second sets of wheels, the method comprising:

selectively driving one or more motors of the first set of at least two motors or the second set of at least two motors to drive the first set of wheels or the second set of wheels in forward or reverse directions.

21. A method of maneuvering a load handing device according to claim 20, comprising:

receiving a signal from a centralised control facility;

selectively engaging the first set of wheels with the first set of parallel rails or tracks or the second set of wheels with the second set of parallel rails or tracks;

navigating the load handing device on the grid to a location specified by the centralised control facility.

22. A method of maneuvering a load handing device according to claim 20, comprising:

receiving a signal from a centralised control facility;

controlling a direction-change mechanism of the load handling device based on the received signal to:

(a) engage the first set of wheels with the first set of parallel rails or tracks;

(b) engage the second set of wheels with the second set of parallel rails or tracks; or (c) engage first and second sets of wheels with the first and second sets of parallel rails or tracks to park the load handling device.

23. A method of maneuvering a load handing device according to claim 20, comprising:

receiving a signal from a centralised control facility;

moving the load handing device on a specified location on the grid; and performing a lifting operation to lift a container from a storage location beneath the grid, or performing a lowering operation to lower a container to a storage location beneath the grid.

\* \* \* \* \*